United States Patent
Hruby et al.

(10) Patent No.: US 9,334,855 B1
(45) Date of Patent: May 10, 2016

(54) HALL THRUSTER FOR USE WITH A CONDENSABLE PROPELLANT

(75) Inventors: Vlad Hruby, Newton, MA (US); James J. Szabo, Jr., Bedford, MA (US); Charles Gasdaska, Shrewsbury, MA (US); Mike Robin, Lincoln, RI (US)

(73) Assignee: Busek Company, Inc., Natick, MA (US)

( * ) Notice: Subject to any disclaimer, the term of this patent is extended or adjusted under 35 U.S.C. 154(b) by 3019 days.

(21) Appl. No.: 11/607,342

(22) Filed: Dec. 1, 2006

Related U.S. Application Data

(60) Provisional application No. 60/741,406, filed on Dec. 1, 2005.

(51) Int. Cl.
    *F03H 1/00*     (2006.01)
    *B64G 1/40*     (2006.01)

(52) U.S. Cl.
    CPC ... *F03H 1/00* (2013.01); *B64G 1/40* (2013.01)

(58) Field of Classification Search
    USPC .......... 60/202, 200.1; 244/171.5, 171.1, 53 R
    See application file for complete search history.

(56) References Cited

PUBLICATIONS

H. R. Kaufman, "Technology of Closed-Drift Thrusters", AIAA Journal, vol. 23 No. 1, pp. 78-87 (1985).
G. R. Seikel et al., "Hall Current Ion Accelerator," Bulletin of the American Physical Society, Ser. II, vol. 7, Jun. 1962, p. 414.
G. R. Seikel, "Generation of Thrust—Electromagnetic Thrusters," Proceedings of the NASA-University Conference on the Science and Technology of Space Exploration, vol. 2, Nov. 1962, pp. 171-176.
M. C. Ellis, Jr., "Survey of Plasma Accelerator Research," Proceedings of the NASA-University Conference on the Science and Technology of Space Exploration, vol. 2, Nov. 1962, pp. 361 and 373-375.
E. C. Lary, et al., "Ion Acceleration in a Gyro-Dominated Neutral Plasma—Theory," Bulletin of the American Physical Society, Ser. II., vol. 7, Jul. 1962, p. 441.
F. Salz, et al., "Ion Acceleration in a Gyro-Dominated Neutral Plasma—Experiment," Bulletin of the American Physical Society, Ser. II., vol. 7, Jul. 1962, p. 441.
G. S. Janes et al., "Anomalous Electron Diffusion and Ion Acceleration in a Low-Density Plasma," The Physics of Fluids, vol. 9, No. 6, Jun. 1966, pp. 1115-1123.

(Continued)

*Primary Examiner* — Christopher P Ellis
(74) *Attorney, Agent, or Firm* — Iandiorio Teska & Coleman, LLP

(57) ABSTRACT

A Hall thruster for use with a condensable propellant including a plasma accelerator including an anode for providing plasma discharge, a distributor for distributing the condensable propellant in a liquid or vaporized state, and an electric circuit including a cathode for emitting electrons attracted to the anode and for neutralizing ion flux emitted from the plasma accelerator. A condensable propellant feed system includes a storage vessel for storing the condensable propellant and providing liquid condensable propellant at a controlled pressure. A condensable propellant flow controller includes a pressure reducing device for controlling the flow rate of the liquid condensable propellant. A vaporizer at or above the vaporization temperature of the liquid condensable propellant vaporizes the liquid condensable propellant at a predetermined vaporization rate and flow rate. A magnetic circuit structure includes a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

82 Claims, 17 Drawing Sheets

(56) References Cited

PUBLICATIONS

R. Meyer, "A Space-Charge-Sheath Electric Thruster," AIAA Journal, vol. 5, No. 11, Nov. 1967, pp. 2057-2059.

J. Szabo, et al., "Bismuth Hall Effect Thruster Development," 53$^{rd}$ JANNAF Propulsion Meeting/2$^{nd}$ Liquid Propulsion Subcommittee/1$^{st}$ Spacecraft Propulsion Meeting, Monterey, CA, Dec. 5-8, 2005, (6 pages total).

A. I. Morozov, et al., "Plasma Accelerator with Closed Electron Drift and Extended Acceleration Zone," Soviet Physics—Technical Physics, vol. 17, No. 1, Jul. 1972, pp. 38-45.

A. I. Morozov, et al., "Effect of the Magnetic Field on a Closed-Electron-Drift Accelerator," Soviet Physics—Technical Physics, vol. 17, No. 3, Sep. 1972, pp. 482-487.

J. Szabo et al., "A Laboratory-Scale Hall Thruster," AIAA-95-2926, 31st AIAA/ASME/SAE/ASEE Joint Propulsion Conference, San Diego, CA, Jul. 10-12, 1995, pp. 1-13.

V. G. Gnedenko, et al., "Prospects for Using Metals as Propellant in Stationary Plasma Engines of Hall-Type," IEBC-95-54, 24th International Electric Propulsion Conference, Moscow, Russia, Sep. 19-23, 1995, (9 pages total).

A. V. Trofimov, "Hall accelerator with cadmium vapor," Sov. Phys. Tech. Phys. 22 (10), Oct. 1977, pp. 1280-1281.

J. Szabo, et al., "Bimodal Bismuth Vapor Hall Thruster," SBIR Phase I Final Report, AFRL-PR-ED-TR-2004-0005, Air Force Research Laboratory, Air Force Materiel Command, Edwards Air Force Base, CA 93524-7048, Jul. 2004, (88 pages).

M. Crofton et al., "A Preliminary Study of Contamination Effects in a Bismuth Hall Thruster Environment," AIAA 2005-4231, 41st AIAA/ASME/SAE/ASEE Joint Propulsion Conference & Exhibit, Tucson, Arizona, Jul. 10-13, 2005, pp. 1-15.

S. D. Grishin; et. al., "Characteristics of a Two-Stage Ion Accelerator with an Anode Layer," Zhurnal Prikladnoi Mekhaniki, i Tekhnicheskoi Fiziki, No. 2, Mar.-Apr. 1978, pp. 166-173.

S. Tverdokhlebov, et al., "Bismuth Propellant Option for Very High Power TAL Thruster," AIAA-2002-0348, 40$^{th}$ AIAA Aerospace Sciences Meeting & Exhibit, Jan. 14-17, 2002, Reno, Nevada, Jan. 2002, pp. 1-6 and title page.

C. Marrese-Reading, et. al., "Very High Isp Thruster with Anode Layer (VHITAL): An Overview," AIAA 2004-5910, M. , Space 2004 Conference and Exhibit, San Diego, California, Sep. 28-30, 2004, pp. 1-6.

D. R. Massey, et al., "Progress on the Development of a Direct Evaporation Bismuth Hall Thruster," AIAA-2005-4232, presented at 41st AIAA/ASME/SAE/ASEE Joint Propulsion Conference and Exhibit, Tucson, Arizona, Jul. 10-13, 2005, pp. 1-8.

J. M. Makela, et al, "Development and Testing of a Prototype Bismuth Cathode for Hall Thrusters," AIAA-2005-4236, presented at 41st AIAA/ASME/SAE/ASEE Joint Propulsion Conference and Exhibit, Tucson, Arizona, Jul. 10-13, 2005, pp. 1-7.

W. Kerslake, et al., "Development and Flight History of SERT II Spacecraft," AIAA-92-3516, 28th AIAA/SAE/ASME/ASEE Joint Propulsion Conference, Nashville, TN, Jul. 6-8, 1992, pp. 1-49, title page, contents page, and Report documentation page.

W. Kerslake, "Design and Test of Porous-Tungsten Mercury Vaporizers," AIAA-72-484, AIAA 9th Electric Propulsion Conference, Bethesda, MD, Apr. 17-19, 1972, pp. 1-12 and cover page.

J. Szabo, et al., "Bismuth Hall Thruster: Final Report," Contract No. NNM04AB47C, Jul. 26, 2004-Sep. 30, 2005, pp. 1-98 and Report Documentation page.

J. Szabo, et al., "Bismuth Hall Thruster with Ceramic Discharge Channel," 53rd JANNAF Propulsion Meeting/ 2nd Liquid Propulsion Subcommittee/1st Spacecraft Propulsion Meeting, Monterey, CA, Dec. 5-8, 2005, pp. 1-11 and Disclosure of Invention and New Technology Form.

V. Rawlin, et al., "Durability of the SERT II Hollow Cathode and Future Applications of Hollow Cathodes," AIAA-69-304, AIAA 7th Electric Propulsion Conference, Williamsburg, VA, Mar. 3-5, 1969, pp. 1-15 and title page.

A. Kieckhafer, et al., "Energetics of Propellant Options for High-Power Hall Thrusters," AIAA 2005-4228, 41st AIAA/ASME/SAE/ASEE Joint Propulsion Conference & Exhibit, Jul. 10-13, 2005, Tucson, Arizona, pp. 1-12.

O. S. Tverdokhlebov et al., "Iodine Propellant for Electric Propulsion—To Be Or Not To Be," AIAA 2001-3350, 37th AIAA/ASME/SAE/ASEE Joint Propulsion Conference & Exhibit, Salt Lake City, UT, Jul. 2001, pp. 1-6.

J. Brophy, et al., "Performance of the Stationary Plasma Thruster: SPT-100," AIAA-92-3155, 28$^{th}$ AIAA/SAE/ASME/ASEE Joint Propulsion Conference, Nashville, TN, Jul. 6-8, 1992, pp. 1-16.

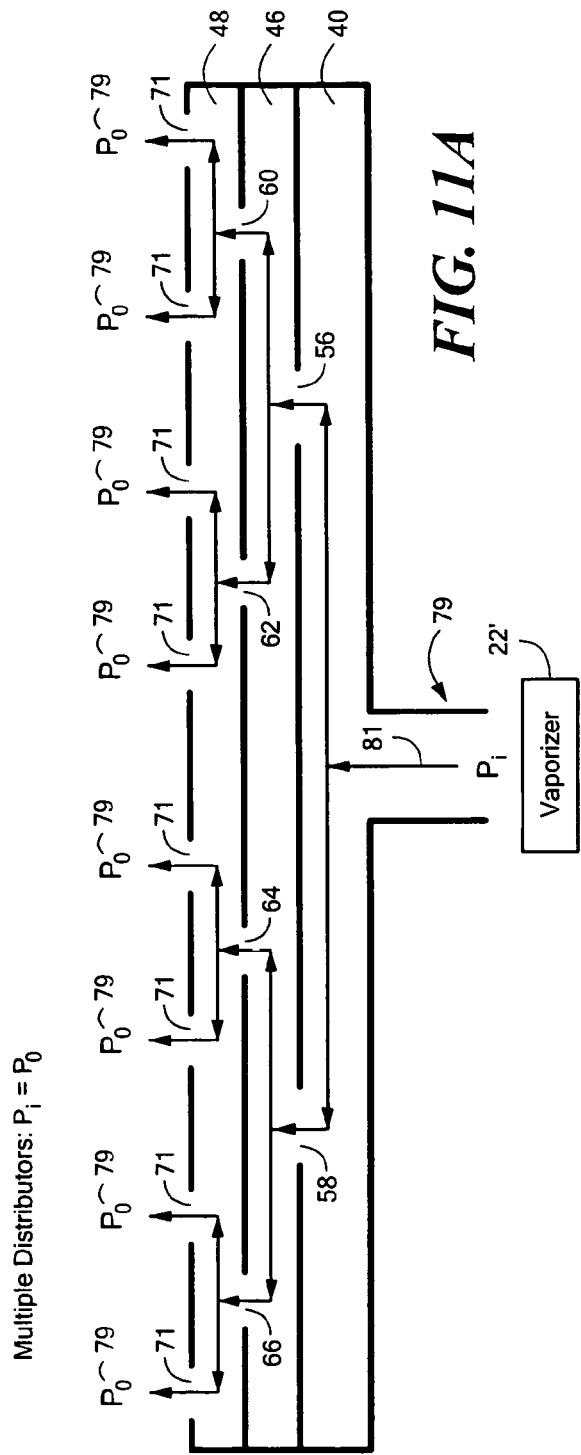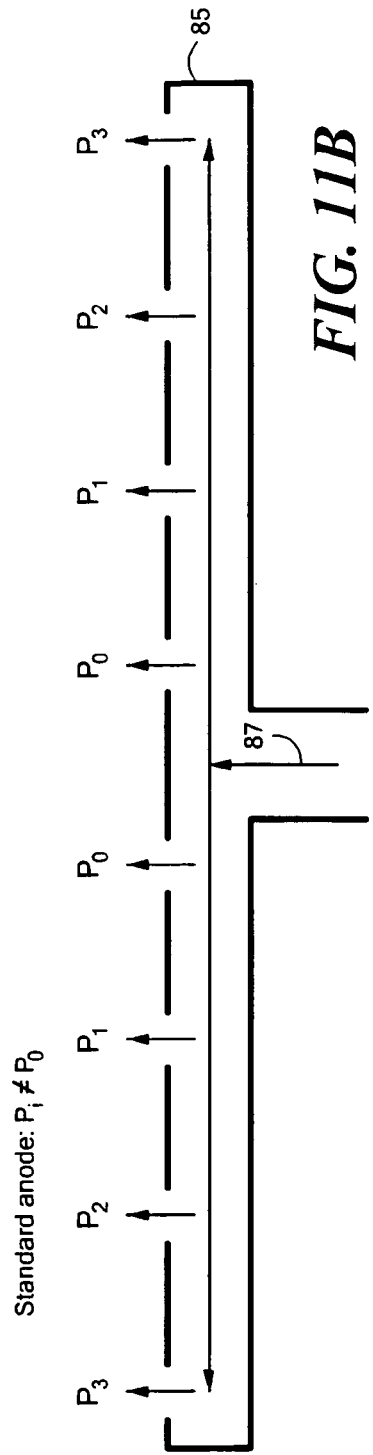

HALL THRUSTER FOR USE WITH A CONDENSABLE PROPELLANT

RELATED APPLICATIONS

This application claims benefit of and priority to U.S. Provisional Application Ser. No. 60/741,406, filed Dec. 1, 2005, incorporated by reference herein.

GOVERNMENT RIGHTS

This invention was made with U.S. Government support under Contract No. Contract No. NNM04AB47C awarded by the National Aeronautics and Space administration, and Contracts Contract No. F04611-03-M-3002 and FA8650-04-C-2473, awarded by the United States Air Force. The Government may have certain rights in the subject invention.

FIELD OF THE INVENTION

This subject invention generally to Hall thrusters and more particularly to a Hall thruster for use with condensable propellants, a combination of condensable propellants and gaseous propellants, and a solid condensable propellant.

BACKGROUND OF THE INVENTION

Hall Thrusters are typically used in rockets, satellites, spacecraft, and the like. In a typical Hall Thruster, the working fluid is plasma and the means of acceleration is an electric field. A conventional Hall thruster typically includes a plasma accelerator that includes a gas distributor and an anode located at one end of a channel. A gaseous propellant, a propellant that is gaseous at standard temperature and pressure, e.g., xenon, is introduced to the plasma accelerator. An electric circuit provides an electric potential applied between the anode and a floating externally located cathode which emits electrons. A magnetic circuit structure establishes a transverse magnetic field in the plasma accelerator presenting an impedance to electrons attracted to the anode. As a result, the electrons spend most of their time drifting azimuthally (orthogonally) due to the transverse magnetic field. This allows the electrons time to collide with and ionize the neutral atoms of the gaseous propellant. The collisions create positively charged ions accelerated by the electric field to create a flux of ions that may be used as an ion source or to create thrust. See e.g., U.S. Pat. Nos. 6,075,321, 6,150,764, and 6,735,935, 6,834,492 and co-pending applications U.S. patent application Ser. No. 10/761,565 entitled Multi-Functional Power Supply for A Hall Thruster, filed on Jan. 21, 2004, U.S. patent application Ser. No. 11/301,857 entitled A Hall Thruster With Shared Magnetic Structure, filed on Dec. 13, 2005, and U.S. patent application Ser. No. 11/412,619 entitled Combined Radio Frequency and Hall Effect Ion Source and Plasma Accelerator System filed on Apr. 27, 2006, by one or more common inventors hereof and all of the same assignee, all of which incorporated in their entirety this reference herein.

Condensable propellants, e.g., Bismuth, exist in a non-gaseous state at standard temperature and pressure. Solid condensable propellants must be heated to achieve a liquid state and then vaporized to produce the gaseous state necessary for use with a Hall thruster, which requires considerable energy. Using condensable propellants, however, can be advantageous over gaseous propellant because they are easy to collect and, in certain cases, non-toxic, inexpensive, and plentiful. Certain condensable propellants also have a higher atomic mass and larger electron impact ionization cross-section than common gaseous propellants, such as xenon. This results in more complete propellant utilization, higher thrust and improved specific impulse. When used with larger Hall thrusters with available energy, the benefits of using condensable propellants often outweigh the energy requirements of heating and converting the condensable propellants to a gaseous state.

One conventional Hall thruster that utilizes condensable propellants is disclosed in U.S. Pat. No. 7,059,111 to King, incorporated by reference herein. The thruster as disclosed by King controls the flow rate and vaporization rate of the condensable propellant using a gravity-fed method that delivers liquid condensable propellant to the vaporizer. The flow rate and vaporization rate of the condensable propellant are determined by controlling the temperature of the vaporizer. During operation, the vaporization process causes the temperature of the vaporizer to increase which increases vaporization and the density of the plasma discharge. This increases feedback of discharge current in the vaporizer, further increasing the heat of the vaporizer which, in turn, increases the flow rate and vaporization rate. Without some type of control, a run-away condition of vaporization rate and flow rate of the condensable propellant results. The King thruster relies on biasing a second anode to control the feedback of discharge current and regulate the temperature of the vaporizer and the resulting vaporization rate and the flow rate. Such techniques are complex and cumbersome, often resulting in the first or second anode melting, and typically run only at one operating condition. The King thruster also requires pre-heating of the anode and discharge chamber through a secondary gas discharge, e.g. xenon.

Other conventional Hall thrusters that utilize condensable propellants employ electromagnetic pumps utilized to control flow rate and vaporization rate, e.g., the Soviet TsNIIMASH TAL thruster as modified for the VHITAL program. Relying on electromagnetic pumps to control flow rate and vaporization rates is complicated and expensive.

Older conventional Hall thrusters that utilize condensable propellants employ external crucibles or vaporization chambers to control the vaporization rate external to the thruster, relying upon gravity to maintain the liquid vapor interface. Relying on gravity to maintain the interface is not a valid approach for space applications. Furthermore, vaporization external to the thruster results in large power losses due to radiation from the propellant flow lines. These losses reduce the system level efficiency.

Hall thrusters or ion sources which can utilize both condensable propellants, such as Bismuth and gaseous propellants, such as Xenon are known. See e.g., the King patent discussed above. However, to date, conventional Hall thrusters that utilize both condensable propellants and gaseous propellants do not store the condensable propellant and the gaseous propellant in a single storage vessel and are unable to control the flow rate of the condensable propellant and the gaseous propellant, or a mixture of the condensable propellant and the gaseous propellant.

A Hall thruster that uses a solid condensable propellant wherein the flow rate and vaporization rate are regulated by controlling the linear feed rate of the solid condensable propellant would be advantageous. To date, no such Hall thruster exists.

BRIEF SUMMARY OF THE INVENTION

It is therefore an object of this invention to provide an improved Hall thruster for use with a condensable propellant.

It is a further object of this invention to provide such a Hall thruster which decouples feedback of discharge current from the vaporization rate and flow rate.

It is a further object of this invention to provide such a Hall thruster which eliminates the need to rely on regulating the temperature of the vaporizer to control vaporization rate and flow rate.

It is a further object of this invention to provide such a Hall thruster which relies on regulating the pressure of the condensable propellant to control vaporization rate and flow rate.

It is a further object of this invention to provide such a Hall thruster which eliminates the requirement for an electromagnetic pump.

It is a further object of this invention to provide such a Hall thruster which is less complex.

It is a further object of this invention to provide such a Hall thruster which eliminates the need to rely on gravity to control the vaporization rate and flow rate.

It is a further object of this invention to provide such a Hall thruster which is less expensive.

It is a further object of this invention to provide to provide such a Hall thruster which can store both condensable propellants and gaseous propellant in a single storage vessel.

It is a further object of this invention to provide to provide such a thruster which controls the flow rate of condensable propellants and gaseous propellants or a mixture of condensable propellants and gaseous propellants.

It is a further object of this invention to provide to provide such a thruster which utilizes a solid condensable propellant and regulates the flow rate and vaporizer rate by controlling the linear feed rate of the solid condensable propellant.

The subject invention results from the realization that a Hall thruster for use with a condensable propellant, in one embodiment, is effected with a condensable propellant feed system that includes a storage vessel for storing the condensable propellant and providing liquid condensable propellant at a controlled pressure. A condensable propellant flow controller having a pressure reducing device controls the flow rate of the liquid condensable propellant. A vaporizer at or above the vaporization temperature of the condensable propellant vaporizes the liquid condensable propellant at a predetermined vaporization rate and flow rate. The vaporized condensable propellant is then ionized to create a flux of ions that may be used to create thrust or as an ion source.

This invention results from the further realization that a Hall thruster for use with a condensable propellant, a gaseous propellant, or a mixture of condensable propellant and gaseous propellant is effected, in one embodiment, with a condensable propellant and gaseous propellant feed system that includes storage vessel for storing liquid condensable propellant and gaseous propellant at a predetermined pressure. A condensable propellant flow controller for controls the flow rate of the liquid condensable propellant and a gaseous propellant flow controller controls the flow rate of the gaseous propellant.

This invention results from the further realization that a Hall thruster for use with a solid condensable propellant is effected, in one embodiment, with a plasma accelerator including an anode for providing plasma discharge and a distributor for distributing vaporized condensable propellant. A condensable propellant feed system includes a coil of solid condensable propellant and provides the solid condensable propellant at a controlled rate to a vaporizer. The vaporizer is at or above the vaporization temperature of the solid condensable propellant and vaporizes the solid condensable propellant to provide condensable propellant at a predetermined vaporization rate and flow rate.

This invention features a Hall thruster for use with a condensable propellant including a plasma accelerator including an anode for providing plasma discharge, a distributor for distributing the condensable propellant in a liquid or vaporized state, and an electric circuit including a cathode for emitting electrons attracted to the anode and for neutralizing ion flux emitted from the plasma accelerator. A condensable propellant feed system includes a storage vessel for storing the condensable propellant and providing liquid condensable propellant at a controlled pressure. A condensable propellant flow controller includes a pressure reducing device for controlling the flow rate of the liquid condensable propellant. A vaporizer at or above the vaporization temperature of the liquid condensable propellant vaporizes the liquid condensable propellant at a predetermined vaporization rate and flow rate. A magnetic circuit structure includes a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

In one embodiment, the condensable propellant feed system may include a feed line coupled between the storage vessel and the condensable propellant flow controller. The feed line may be heated. The condensable propellant feed system may include a pump for delivering liquid condensable propellant to the propellant flow controller. The Hall thruster may include a heater disposed about the storage vessel for melting solid condensable propellant to form the liquid condensable propellant. The storage vessel may include a pressurized gas for introducing the liquid condensable propellant to the condensable propellant feed system at the controlled pressure. The condensable propellant feed system may include a pressure regulating device for controlling the pressure of the liquid condensable propellant exiting in the condensable propellant feed system. The condensable propellant flow controller may include a pressure measurement device. The condensable propellant may be a condensable propellant chosen from the group consisting of: bismuth, cadmium, cesium, magnesium, iodine, lithium, tin, mercury, lead, indium, germanium, zinc, sulfur, phosphorus, selenium, sodium, potassium, and rubidium. The pressurized gas may be a gas chosen from the group consisting of xenon, helium, neon, argon, krypton, oxygen, radon, and nitrogen. The pressure reducing device may include a porous medium, a capillary, an orifice sized to control the flow rate of the liquid condensable propellant, or a plenum. The vaporizer may include a heated surface, a heated portion of a porous medium, a heated portion of a capillary, or a heat exchanger. The pressure regulating device and the vaporizer may be integrated on a porous medium such that the porous medium controls the flow rate of the liquid condensable propellant and a heated surface of the porous medium vaporizes the liquid condensable propellant. The pressure regulating device and the vaporizer may be integrated on a porous medium such that the porous medium controls the flow rate of the liquid condensable propellant and a heated portion of the porous medium vaporizes the liquid condensable propellant. The pressure reducing device may include a porous medium that controls the flow rate of the liquid condensable propellant and another porous medium that vaporizes the condensable propellant. The condensable propellant flow controller, the vaporizer, and the distributor may be located outside the plasma accelerator. The condensable propellant flow controller, the vaporizer, and the distributor may be located inside the plasma accelerator. One or more of the condensable propellant flow controller, the vaporizer, and the distributor may be located inside the plasma accelerator and one or more of the condensable flow controller, the vaporizer, and the distributor may be located outside the plasma accelerator. The distributor may include a cavity, a wicking medium a solid surface, or sonic orifices. The Hall thruster may include a heater disposed about the distributor. At least one of the condensable propellant flow controller, the vaporizer, and the distributor may be coupled to each other in a predetermined arrangement. The distributor may receive vaporized condensable propellant from the vaporizer and distribute the vaporized condensable propellant to the plasma accelerator. The distributor may receive liquid condensable propellant from the condensable propellant flow controller and distribute the liquid condensable propellant to the vaporizer. The distributor may receive liquid condensable propellant from the condensable propellant feed system and distribute the liquid condensable propellant to the condensable propellant flow controller. The Hall thruster may include a second distributor for receiving liquid condensable propellant from the condensable propellant flow controller having a plurality of pressure reducing devices and the second distributor distributes the liquid condensable propellant to the vaporizer. The Hall thruster may include a plurality of distributors each having an annular plate on one side having a predetermined number of azimuthally-spaced orifices and another annular plate on the other side having a predetermined number of azimuthally-spaced orifices for providing a uniform flow path and pressure of the vaporized condensable propellant introduced to the plasma accelerator. Heat from the anode may be used to increase vaporization of the condensable propellant. The Hall thruster may include a composite anode including a housing with inner and outer walls forming an outer anode and an inner anode forming inner and outer distributor zones for containing the plasma.

This invention also features an ion source for use with a condensable propellant including a plasma accelerator including an anode for providing plasma discharge, a distributor for distributing the condensable propellant in a liquid or vaporized state, and an electric circuit including a cathode for emitting electrons attracted to the anode and for neutralizing ion flux emitted from the plasma accelerator. A condensable propellant feed system includes a storage vessel for storing the condensable propellant and providing liquid condensable propellant at a controlled pressure. A condensable propellant flow controller includes a pressure reducing device for controlling the flow rate of the liquid condensable propellant. A vaporizer at or above the vaporization temperature of the liquid condensable propellant for vaporizes the liquid condensable propellant at a predetermined vaporization rate and flow rate. A magnetic circuit structure includes a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

This invention further features a Hall thruster for use with a condensable propellant, a gaseous propellant, or a mixture of condensable propellant and gaseous propellant including a plasma accelerator including an anode for providing plasma discharge, a distributor for distributing vaporized condensable propellant, gaseous propellant, or the mixture of vaporized condensable propellant and gaseous propellant, and an electric circuit including a cathode for emitting electrons attracted to the anode and for neutralizing ion flux emitted from the plasma accelerator. A condensable propellant and gaseous propellant feed system includes a storage vessel for storing the liquid condensable propellant and the gaseous propellant at a predetermined pressure. A condensable propellant flow controller controls the flow rate of the liquid condensable propellant. A gaseous propellant flow controller for controls the flow rate of the gaseous propellant. A magnetic circuit structure including a magnetic field source for establishing a transverse magnetic field in the plasma accelerator that creates an impedance to the flow of the electrons toward the anode to create plasma in the plasma accelerator for accelerating ionized condensable propellant, gaseous propellant, or a mixture of the condensable propellant and gaseous propellant through the plasma accelerator to create a flux of ions.

In one embodiment, the condensable propellant flow controller may include a pressure reducing device. The condensable propellant feed system and the gaseous propellant feed system each may include a feed line. The feed line may be coupled to the condensable propellant feed system is heated. The Hall thruster may include a heater disposed about the storage vessel for melting solid condensable propellant to form the liquid condensable propellant. The condensable propellant feed system may include a pressure regulating device for controlling the pressure of the liquid condensable propellant exiting in the compensable propellant feed system. The condensable propellant flow controller may include a pressure measurement device. The condensable propellant may be a condensable propellant chosen from the group consisting of: bismuth, cadmium, cesium, magnesium, iodine, lithium, tin, mercury, lead, indium, germanium, zinc, sulfur, phosphorus, selenium, sodium, potassium, and rubidium. The gaseous propellant may be a gas chosen from the group consisting of xenon, helium, neon, argon, krypton, oxygen, radon, and nitrogen. The pressure reducing device may include a porous medium, a capillary, an orifice sized to control the flow rate of the liquid condensable propellant, or a plenum. The Hall thruster may include a vaporizer for vaporizing the liquid condensable propellant at a predetermined vaporization rate and flow rate. The vaporizer may include a heated surface, a porous medium, a capillary, or a heat exchanger. The pressure regulating device and a vaporizer may be integrated on a porous medium such that the porous medium controls the flow rate of the liquid condensable propellant and a heated surface of the porous medium vaporizes the liquid condensable propellant. The pressure regulating device and a vaporizer may be integrated on a porous medium such that the porous medium controls the flow rate of the liquid condensable propellant and a heated portion of the porous medium vaporizes the liquid condensable propellant. The pressure reducing device may include a porous medium that controls the flow rate of the liquid condensable propellant and another porous medium that vaporizes the condensable propellant. The condensable propellant flow controller, and the gaseous propellant flow controller, the vaporizer, and the distributor may be located outside the plasma accelerator. The condensable propellant flow controller, and the gaseous propellant flow controller, the vaporizer, and the distributor may be located inside the plasma accelerator. One or more of the condensable propellant flow controller, a vaporizer, and the distributor may be located inside the plasma accelerator. One or more of the condensable flow controller, the vaporizer, and the distributor are located outside the plasma accelerator. The distributor may include a cavity, a wicking medium, a solid surface, or sonic orifices. The Hall thruster may include a heater disposed about the distributor. At least one of the condensable propellant flow controller, the vaporizer, and the distributor may be coupled to each other in a predetermined arrangement. The distributor may receive vaporized condensable propellant from the vaporizer and gaseous propellant from the gaseous propellant flow controller and distribute the vaporized condensable propellant and gaseous propellant to the plasma accelerator. The distributor may receive vaporized condensable propellant from the vaporizer and distribute the vaporized condensable propellant to the plasma accelerator and a gas distributor receives gaseous propellant from the gaseous propellant flow controller and distributes the gaseous propellant to the plasma accelerator. The distributor may receive liquid condensable propellant from the condensable propellant flow controller and distribute the liquid condensable propellant to the vaporizer. The distributor may receive liquid condensable propellant from the condensable propellant feed system and distribute the liquid condensable propellant to the condensable propellant flow controller. The Hall thruster may further include a second distributor for receiving liquid condensable propellant from the condensable propellant flow controller and the second distributor distributes the liquid condensable propellant to the vaporizer. The Hall thruster may further include a plurality of distributors each having an annular plate on one side having a predetermined number of azimuthally-spaced orifices and another annular plate on the other side having a predetermined number of azimuthally-spaced orifices for providing a uniform flow path and pressure of the vaporized condensable propellant introduced to the plasma accelerator. Heat from the anode may be used to increase vaporization of the condensable propellant. The Hall thruster may further include a composite anode including a housing with inner and outer walls forming an outer anode and an inner anode forming inner and outer distributor zones for containing the plasma.

This invention further features an ion source for use with a condensable propellant, a gaseous propellant or a mixture of condensable propellant and gaseous propellant including a plasma accelerator including an anode for providing plasma discharge, a distributor for distributing vaporized condensable propellant, gaseous propellant, or a mixture of the vaporized condensable propellant and gaseous propellant into the plasma accelerator, and an electric circuit including a cathode for emitting electrons attracted to the anode and for neutralizing ion flux emitted from the plasma accelerator. A condensable propellant and gaseous propellant feed system includes a storage vessel for storing liquid condensable propellant in a liquid state and the gaseous propellant at a predetermined pressure. A condensable propellant flow controller system controls the flow rate of the liquid condensable propellant to the gas distributor. A gaseous propellant flow controller controls the flow rate of the gaseous propellant; and a magnetic circuit structure includes a magnetic field source for establishing a transverse magnetic field in the plasma accelerator that creates an impedance to the flow of the electrons toward the anode to create plasma in the plasma accelerator for accelerating ionized condensable propellant, gaseous propellant, or a mixture of condensable propellant and gaseous propellant through the plasma accelerator to create a flux of ions.

This invention also features a Hall thruster for use with a condensable propellant, a gaseous propellant or a mixture of condensable and gaseous propellant including a plasma accelerator including an anode for providing plasma discharge, a distributor for distributing vaporized condensable propellant, gaseous propellant, or a mixture of the vaporized condensable propellant and gaseous propellant into the plasma accelerator, and an electric circuit including a cathode for emitting electrons attracted to the anode and for neutralizing ion flux emitted from the plasma accelerator. A condensable propellant and gaseous propellant feed system includes a storage vessel for storing liquid condensable propellant in a liquid state and the gaseous propellant at a predetermined pressure. A condensable flow controller includes a pressure reducing device for controlling the flow rate of the liquid condensable propellant to the gas distributor. A gaseous propellant flow controller controls the flow rate of the gaseous propellant, a vaporizer at or above the vaporization temperature of the liquid condensable propellant vaporizes the liquid condensable propellant at a predetermined vaporization rate and flow rate. A magnetic circuit structure includes a magnetic field source for establishing a transverse magnetic field in the plasma accelerator that creates an impedance to the flow of the electrons toward the anode to create plasma in the plasma accelerator for accelerating ionized condensable propellant, gaseous propellant and a mixture of condensable propellant and gaseous propellant through the plasma accelerator to create a flux of ions.

This invention also features an ion source for use with a condensable propellant, a gaseous propellant or a mixture of condensable and gaseous propellant including a plasma accelerator including an anode for providing plasma discharge, a distributor for distributing vaporized condensable propellant, gaseous propellant, or a mixture of the vaporized condensable propellant and gaseous propellant into the plasma accelerator, and an electric circuit including a cathode for emitting electrons attracted to the anode and for neutralizing ion flux emitted from the plasma accelerator. A condensable propellant and gaseous propellant feed system includes a storage vessel for storing liquid condensable propellant in a liquid state and the gaseous propellant at a predetermined pressure. A condensable flow controller includes a pressure reducing device for controlling the flow rate of the liquid condensable propellant to the gas distributor. A gaseous propellant flow controller controls the flow rate of the gaseous propellant, a vaporizer at or above the vaporization temperature of the liquid condensable propellant for vaporizes the liquid condensable propellant at a predetermined vaporization rate and flow rate. A magnetic circuit structure includes a magnetic field source for establishing a transverse magnetic field in the plasma accelerator that creates an impedance to the flow of the electrons toward the anode to create plasma in the plasma accelerator for accelerating ionized condensable propellant, gaseous propellant and a mixture of condensable propellant and gaseous propellant through the plasma accelerator to create a flux of ions.

This invention further features a Hall thruster for use with a solid condensable propellant including a plasma accelerator including an anode for providing plasma discharge, a distributor for distributing vaporized condensable propellant to the plasma accelerator, and an electric circuit including a cathode for emitting electrons attracted to the anode and for neutralizing ion flux emitted from the plasma accelerator. A condensable propellant feed system includes a predetermined form of solid condensable propellant for providing solid condensable propellant at a controlled rate. A vaporizer at or above the vaporization temperature of the solid condensable propellant vaporizes the solid condensable propellant to provide vaporized condensable propellant at a predetermined vaporization rate and flow rate and introduces the vaporized condensable propellant to the distributor. A magnetic circuit structure includes a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

In one embodiment, the predetermined form of the condensable propellant is a form chosen from the group consisting of a coil, granules, grains, pellets, and rods. The solid condensable propellant may be a condensable propellant chosen from the group consisting of: bismuth, cadmium, cesium, magnesium, iodine, lithium, tin, lead, indium, germanium, zinc, sulfur, phosphorus, selenium, sodium, potassium, and rubidium.

This invention also features a Hall thruster for use with a condensable propellant including a plasma accelerator including an anode for providing plasma discharge, a distributor for distributing the condensable propellant in a liquid or vaporized state, and an electric circuit including a cathode for emitting electrons attracted to the anode and for neutralizing ion flux emitted from the plasma accelerator. A condensable propellant feed system includes a storage vessel for storing the condensable propellant and providing liquid condensable propellant at a controlled pressure. A condensable propellant flow controller includes a pressure reducing device for controlling the flow rate of the liquid condensable propellant. A vaporizer at or above the vaporization temperature of the liquid condensable propellant vaporizes the liquid condensable propellant at a predetermined vaporization rate and flow rate and introducing the vaporized condensable propellant into the plasma accelerator. A magnetic circuit structure includes a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

This invention further features a Hall thruster for use with a condensable propellant including a condensable propellant feed system including a storage vessel for storing the condensable propellant and providing liquid condensable propellant at a controlled pressure. A condensable propellant flow controller includes a pressure reducing device for controlling the flow rate of the liquid condensable propellant. A vaporizer at or above the vaporization temperature of the liquid condensable propellant for vaporizes the liquid condensable propellant at a predetermined vaporization rate and flow rate and introducing the vaporized condensable propellant to the Hall thruster to create a flux of ions.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 11A is a schematic side view showing the uniform pressure and flow path of the vaporized condensable propellant provided by the plurality of distributors shown in FIG. 9;

FIG. 11B is a schematic side view showing non-uniform pressure and flow path of the vaporized condensable propellant when a single distributor is used;

DETAILED DESCRIPTION OF THE INVENTION

Figure 1:
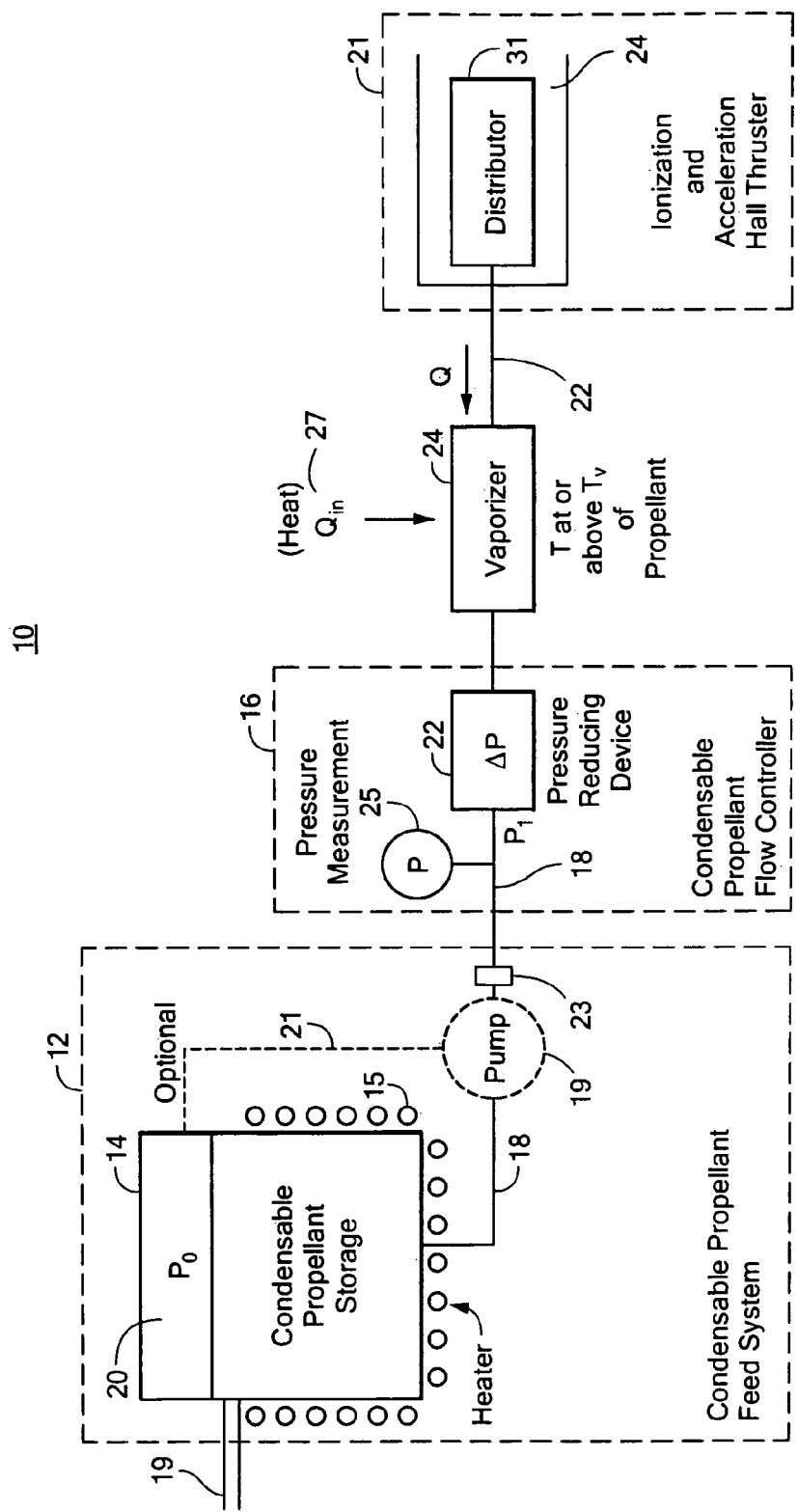
FIG. 1 is simplified, side sectional, schematic block diagram showing the primary components of one embodiment of the Hall thruster for use with a condensable propellant in accordance with this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In one example, Hall thruster 10, FIG. 1, of this invention for use with a condensable propellant includes condensable propellant feed systems 12 with storage vessel 14 for storing a condensable propellant, e.g., bismuth, cadmium, cesium, magnesium, iodine, lithium, tin, mercury, lead, indium, germanium, zinc, sulfur, phosphorus, selenium, sodium, potassium, rubidium, and similar type condensable propellants. Typically, the condensable propellant stored in storage vessel 14 is in a solid state and heater 15 about storage vessel 14 melts the solid condensable propellant therein to a liquid state. In other designs, the condensable propellant in storage vessel 14 may already be in a liquid state provided by feed line 19 from an external source (not shown). In either case, the liquid condensable propellant in storage vessel 14 is provided to condensable propellant flow controller 16 by feed line 18. In one embodiment, pressurized gaseous propellant in storage vessel 14, indicated at 20, e.g., xenon, helium, neon, argon, krypton, oxygen, radon, nitrogen, or similar type gaseous propellants produce a controlled pressure, e.g., 2400 psi, to drive the liquid condensable propellant via feed line 18 to condensable propellant flow controller 16. When pressurized condensable propellant is utilized, condensable propellant feed system 12 may include pressure regulating device 23, e.g., an electromagnetic pump or control valve, which regulates the pressure of the liquid condensable propellant in feed line 18. Pressure regulating device 23, e.g., a control valve or similar type device reduces the pressure of condensable propellant in feed line 18 to a pressure of about 1 to 15 psi. In other designs, pump 19 may used to deliver the liquid condensable propellant and/or gaseous propellant by feed lines 18 and 21, respectively, to condensable propellant flow controller 16 at the controlled pressure. Typically, feed line 18 is heated to prevent condensation of liquid condensable propellant therein.

Condensable propellant flow controller 16 includes pressure reducing device 22 that controls the flow rate of the liquid condensable delivered to vaporizer 24 by reducing the pressure between feed lines 18 and 28, e.g., from about 1 to 15 psi to about 0.010 psi. Preferably, pressure reducing device 22 includes include a porous medium, a capillary, an orifice sized to control the flow rate of the liquid condensable propellant, or a plenum, as discussed in further detail below. Pressure reducing device 22 typically provides a controlled flow rate of liquid condensable propellant at a rate of about 1-10 mg/s to vaporizer 24 by feed line 28. Condensable propellant flow controller 16 may also include pressure measurement device 25 which measures the pressure of condensable propellant in feed line 18 upstream of pressure reducing device 22.

Vaporizer 24 receives the liquid condensable propellant at the predetermined controlled flow rate and is maintained at or above the vaporization temperature of the condensable propellant with an influx of heat, Q, indicated at 25 (discussed below). The temperature of vaporizers does not need to be regulated to control flow rate and vaporization rate, as found in conventional Hall thrusters. Vaporizer 24 vaporizes the liquid condensable propellant at a predetermined vaporization rate and flow rate e.g., 5 mg/s, and introduces the vaporized condensable propellant into Hall thruster 11 via feed line 22, where it is ionized to create a flux of ions that can be used for, inter alia, an ion source or to create thrust, as discussed below.

The result is Hall thruster 10 for use with a condensable propellant that effectively controls vaporization rate and flow rate by controlling the flow rate of liquid condensable propellant using pressure and condensable propellant flow controller 16 with pressure reducing device 22. Thus, Hall thruster 10 eliminates the need to rely on regulating the temperature of the vaporizer with a second anode and complicated biasing circuits that typically only operate at one predetermined operating condition, or the requirement to use electromagnetic pumps or rely on gravity to determine the flow rate and vaporization rate.

In one design, distributor 31 receives the vaporized condensable propellant by feed line 22 and distributes the vaporized condensable propellant into plasma accelerator 21. Anode 30, FIG. 2, where like parts have been given like numbers, attracts electrons 28-31 emitted from cathode 26. Electric circuit 32 creates an axial field 38 (E) and magnetic field source 33, e.g., an electromagnetic coil or similar type device known to those skilled in the art, attached to magnetic circuit structure 32 creates transverse magnetic field 36 (B). Transverse magnetic field 36 provides an impedance to the flow of electrons 28-31 towards anode 30 which forces electrons to travel in a helical fashion about magnetic field lines associated with magnetic field 36 as shown in FIG. 3. When the electrons trapped by magnetic field 36 collide with condensable propellant atoms, e.g., atom 33, they create positively charged ions. The positively charged ions are rapidly expelled from discharge chamber 24 of plasma accelerator 21 due to axial electric field 38, indicated at 46, to create a flux of ions that may be used the generate thrust or used as an ion source. For example, when electron 53 on magnetic field line 36 collides with condensable propellant atom 33, indicated by arrow 35, the collision strips one of the electrons, e.g., electron 44 from condensable propellant atom 23, to create positively charged condensable propellant ion 45 which is expelled from discharge chamber 24 by axial electric field 38 to generate a flux of ions.

Figure 4:
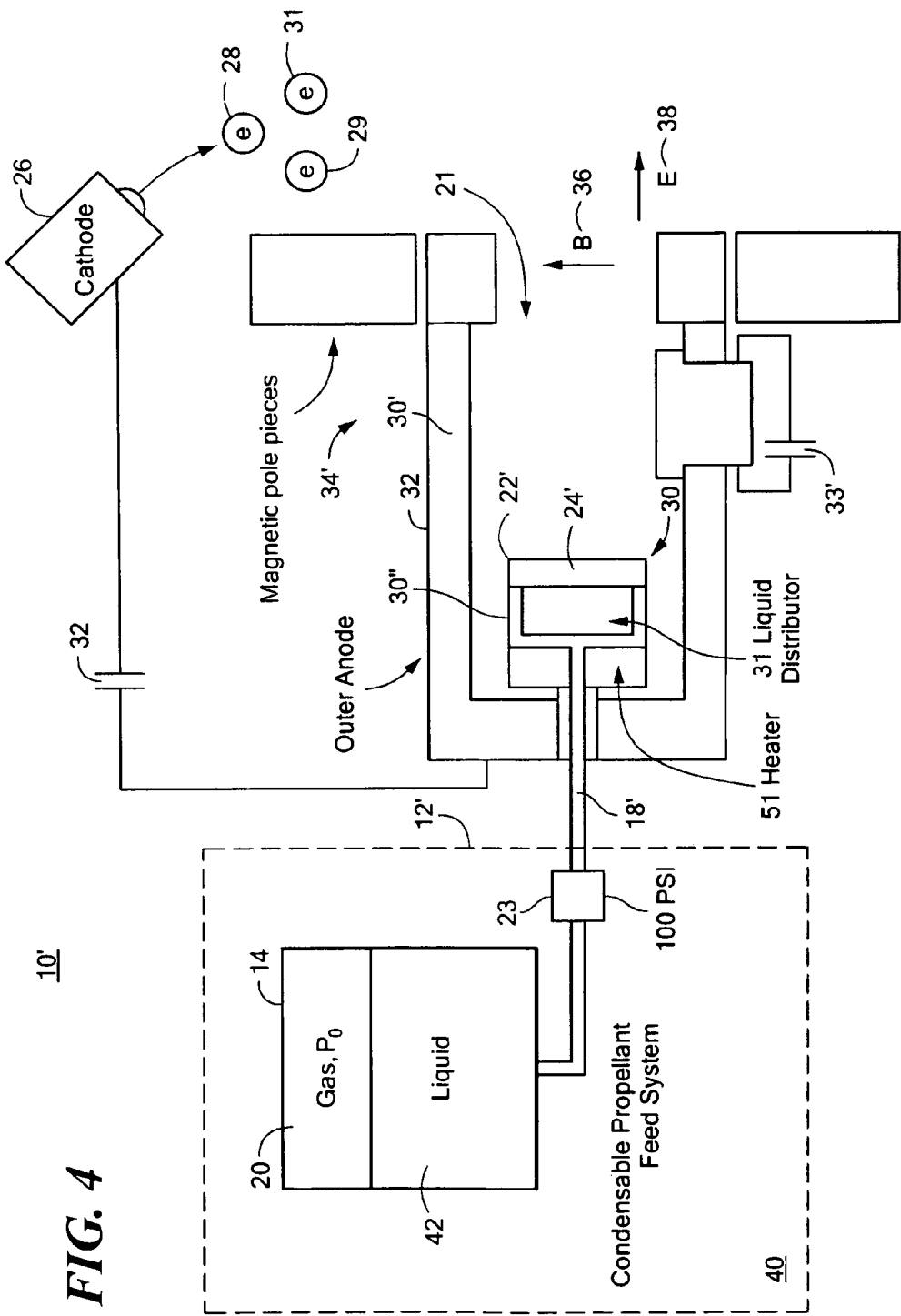
FIG. 4 is a side sectional schematic diagram of another embodiment of Hall thruster for use with condensable propellant in accordance with this invention.
Figure 5:
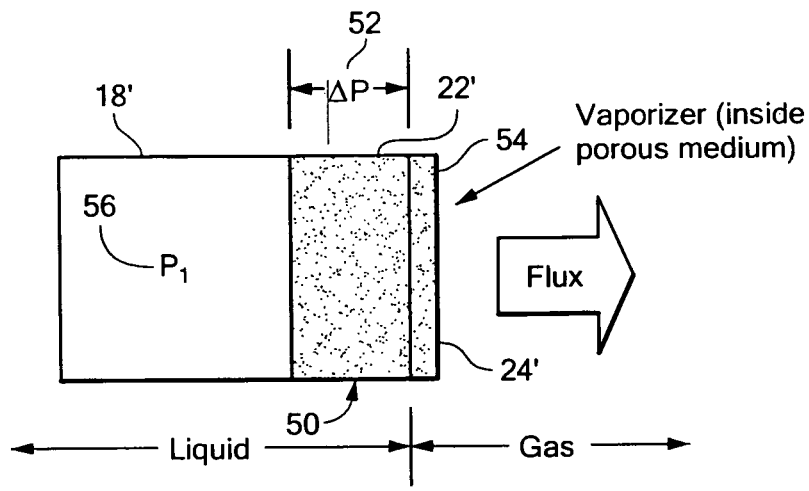
FIG. 5 is a schematic side view showing in further detail one example of the pressure reducing device and vaporizer shown in FIGS. 1 and 4.

FIG. 4, where like parts have been given like numbers, shows one exemplary embodiment of Hall thruster 10' for use with a condensable propellant of this invention. Hall thruster 10' includes storage vessel 14 that stores liquid condensable propellant, indicated at 42, and pressurized gaseous propellant, indicated 20, similar as discussed above in reference to FIG. 1. Condensable propellant feed system 12 includes pressure regulating device 23 which reduces the pressure of liquid condensable propellant in feed line 18' to a pressure of about 1 to 3 psi which can be managed by pressure reducing device 22, similar as discussed above. The liquid condensable propellant in feed line 18' is delivered to liquid distributor 31' which distributes liquid condensable propellant to pressure reducing device 22'. Liquid distributor 31' also acts as an inner anode forming inner and outer distribution zones for containing the plasma, as disclosed in detail in U.S. Pat. No. 6,075,321 cited supra. In this example, pressure reducing device 22' is comprised of porous medium 50, FIG. 5, e.g., a material such as stainless steel, molybdenum, or tungsten comprised of sintered particles having a gap there between of about 0.2 to 0.5 microns and a porsity between 20 to 40%. Porous medium 50 of pressure reducing device 22' reduces the pressure of the liquid condensable received by distributor 31' and controls the flow rate of the liquid condensable propellant delivered to vaporizer 24'. The pressure, $P_1$—56, of liquid condensable propellant in feed line 18', e.g., 1 to 15 psi must be greater than the penetration pressure, Pp, e.g., 1 to 15 psi of porous medium 50. Section 52 of porous medium 50 reduces the pressure of the liquid condensable propellant delivered to vaporizer 24' from about 1 to 15 psi to about 0.010 psi. The result is that pressure reducing device 22' effectively controls the flow rate of the liquid condensable propellant delivered to vaporizer 24'.

Vaporizer 24' includes portion 54 of porous medium 50 that is heated to a temperature greater than or equal to the vaporization temperature of liquid condensable propellant. Heater 51, FIG. 4 provides the necessary heat to maintain portion 54, FIG. 5, at or above the vaporization temperature of the liquid condensable entering vaporizer 24'. Vaporizer 24' vaporizes the liquid condensable propellant at the desired vaporization rate and flow rate, e.g. 1-10 mg/s, and introduces the vaporized condensable propellant to plasma accelerator 21, FIG. 4. Similarly as discussed above with reference to FIGS. 2-3, electric circuit 32 creates axial electric field E—38. Electromagnetic structure 34' with magnetic field source 33', e.g., an electromagnetic coil or similar type device, establishes transverse magnetic field B—36 in plasma accelerator 21 that creates an impedance to the flow of electrons 28-31 emitted by cathode 26 toward the anodes 30' and 30" to create plasma in plasma accelerator 21 to accelerate ionized condensable propellant through plasma accelerator 21 to create a flux of ions that may be used to create thrust or as an ion source, similar as described above with reference to FIGS. 2 and 3.

Figure 6:
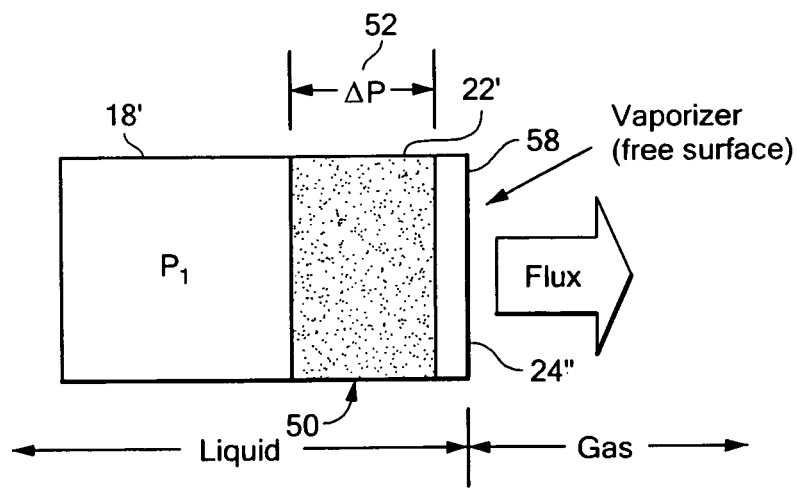
FIG. 6 is a schematic side view showing in further detail another example of the pressure reducing device and vaporizer shown in FIGS. 1 and 4.

As shown above, pressure reducing device 22', FIG. 5 and vaporizer 24' are integrated on porous medium 50 and vaporizer 24' includes section 54 of porous medium 50. In other designs, pressure reducing device 22', FIG. 6, where like parts have been given like numbers, includes porous medium 50 and vaporizer 24" includes surface 58 heated at or above the vaporization temperature of the condensable propellant in section 52.

Figure 7:
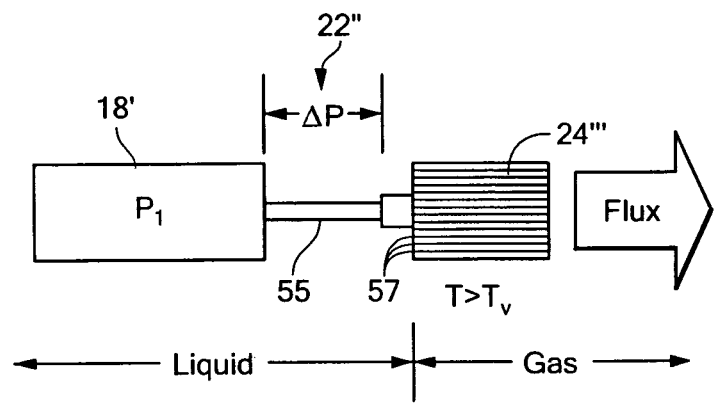
FIG. 7 is a schematic side view showing in further detail another example of the pressure reducing device and vaporizer shown in FIGS. 1 and 4.

In other examples, pressure reducing device 22", FIG. 7 may include capillary 55 that reduces the pressure of the condensable propellant in feed line 18' as discussed above to control the flow rate of the liquid condensable propellant delivered to vaporizer 24'". In this example, vaporizer 24'" is a heat exchanger, e.g., a device comprised of layers 57 of a heat conducting material, e.g., molybdenum that are maintained at a temperature greater than or equal to the vaporization temperature of the condensable propellant in capillary 55.

Figure 8:
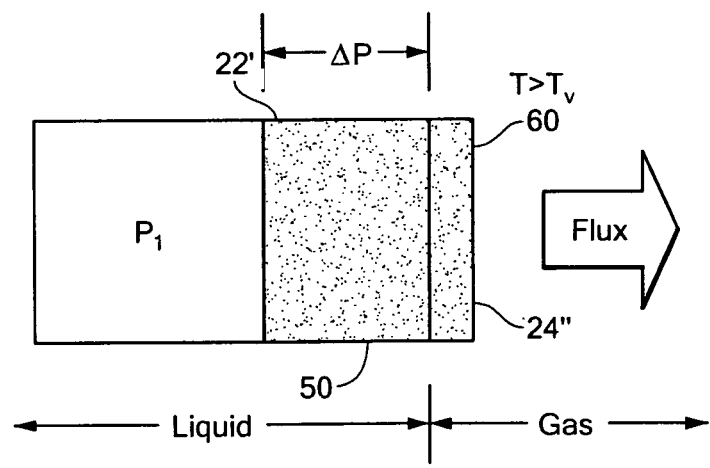
FIG. 8 is a schematic diagram showing in further detail of yet another example of the pressure reducing device and vaporizer shown in FIGS. 1 and 4.

In yet another example, pressure reducing device 22', FIG. 8, where like parts have been given like number, includes porous medium 50 with vaporizer 24" that includes heated surface 58 at or above the vaporization temperature of the liquid condensable propellant, as discussed above with reference to FIG. 6. In this example, a second porous medium 60 coupled to surface 58 vaporizes the condensable propellant prior to distribution to the plasma accelerator 21, FIG. 4.

Figure 2:
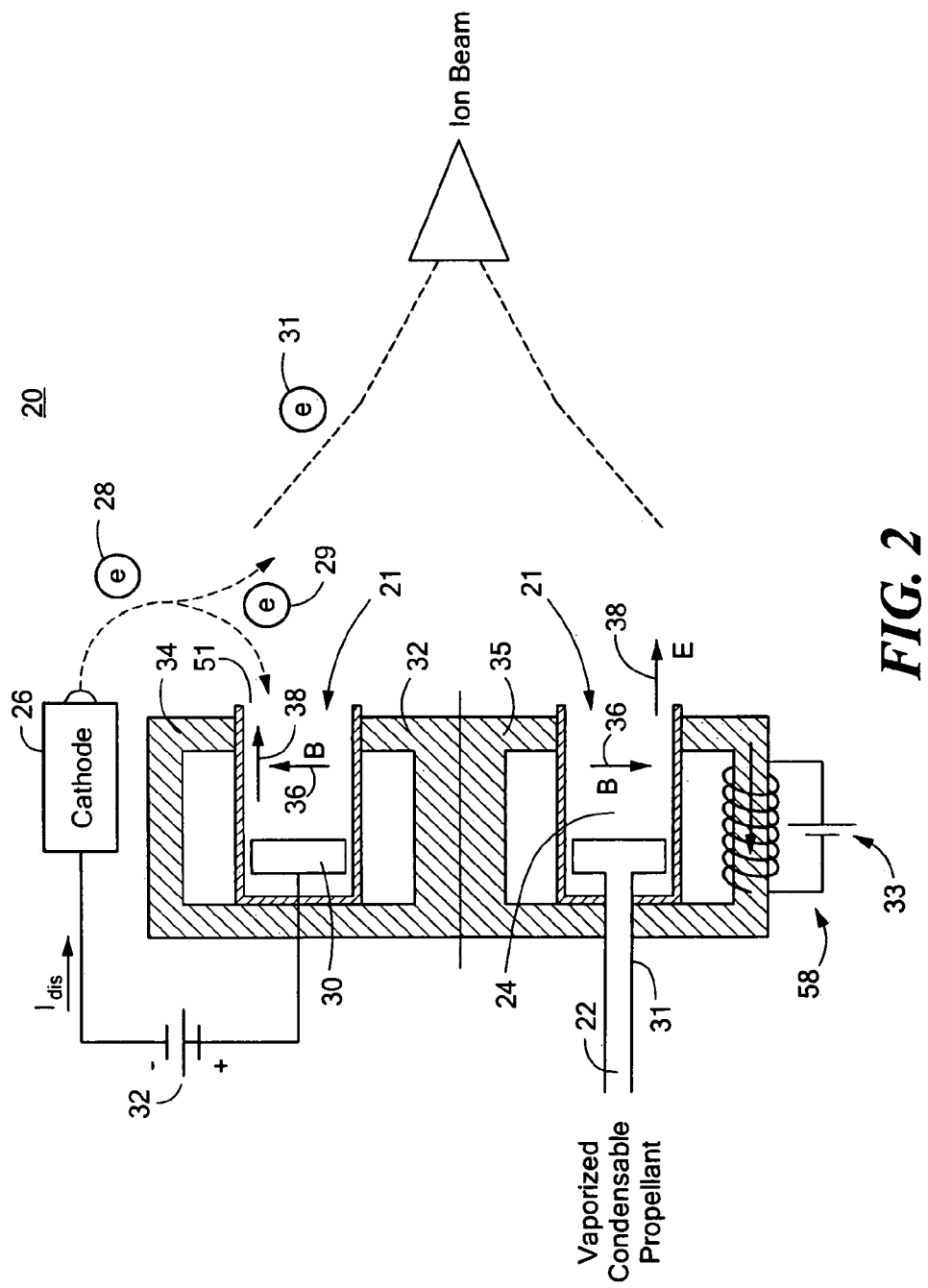
FIG. 2 is a schematic end view showing one embodiment of the distributor, the cathode, the anode, and the magnetic circuit structure associated with the Hall thruster shown in FIG. 1
Figure 3:
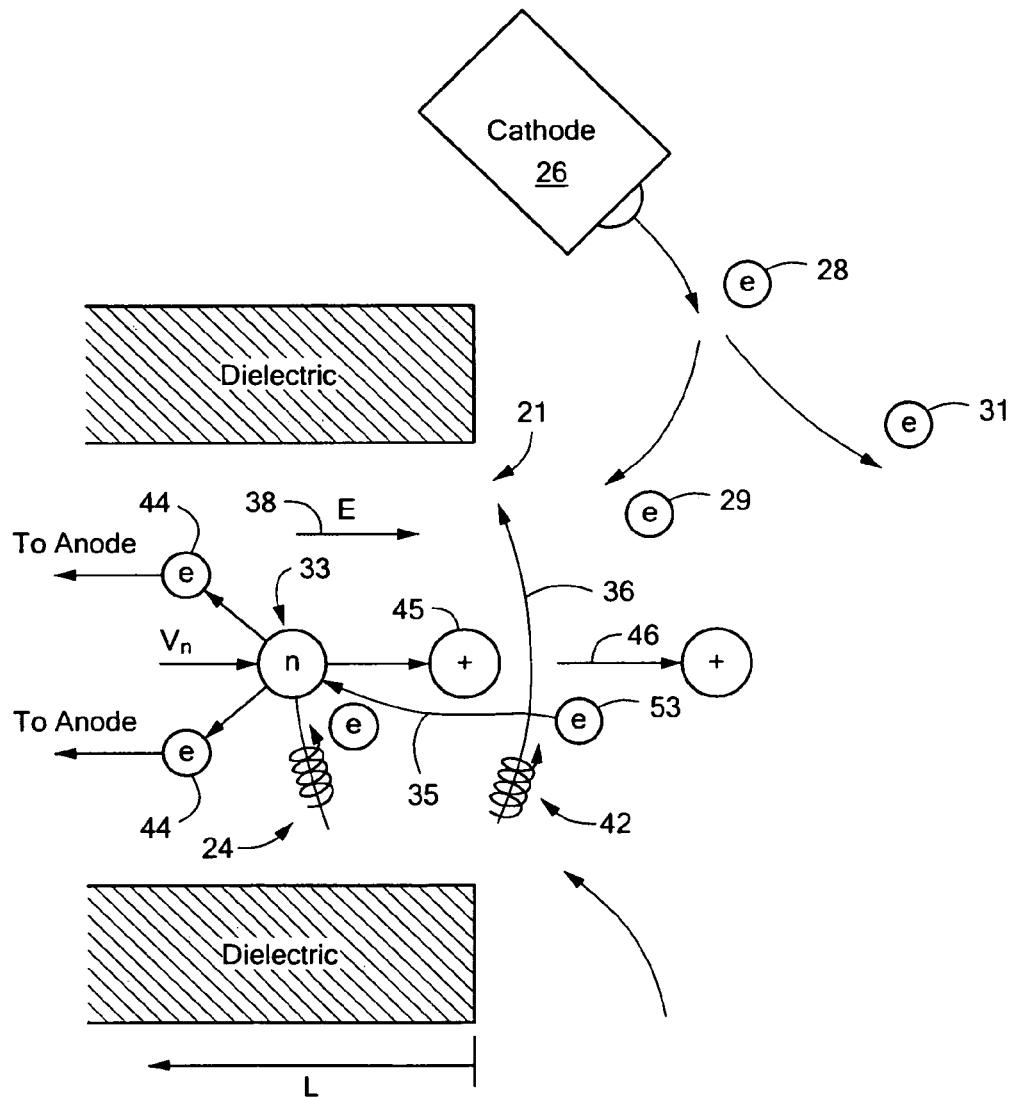
FIG. 3 is an enlarged view illustrating the ionization of the condensable propellant by electron impact and the interaction of the transverse magnetic field and electric field that accelerates the condensable propellant for the Hall thruster shown in FIGS. 1 and 2.

Any one of the embodiments for pressure reducing devices 22', 22" and vaporizer 24', 24", 24'" described above with reference to FIGS. 5-8 may also be employed with Hall thruster 10, FIGS. 1-3.

Figure 9:
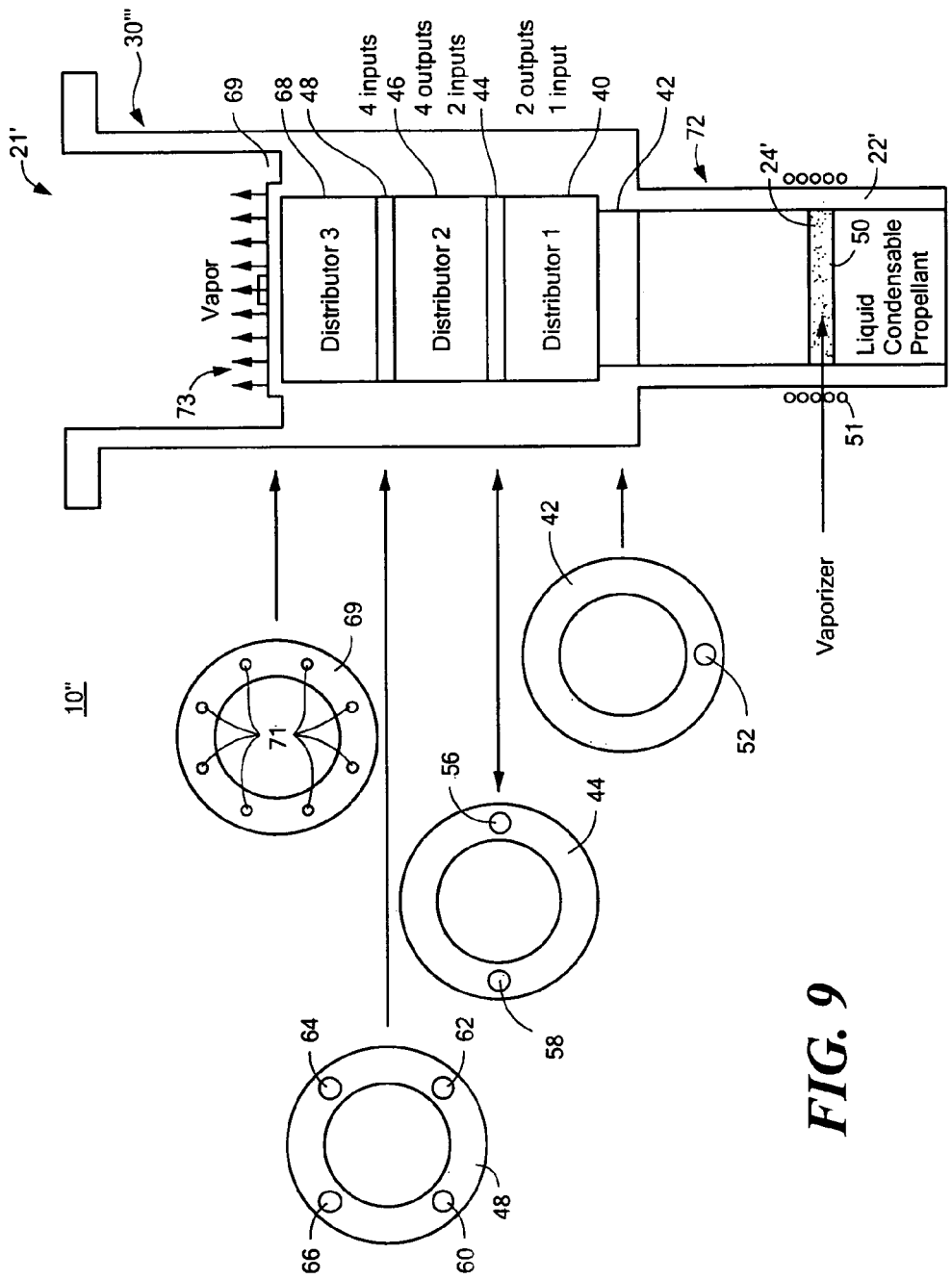
FIG. 9 is a side sectional schematic diagram of another embodiment of Hall thruster for use with condensable propellant employing a plurality of distributors in accordance with this invention.

Hall thruster 10", FIG. 9, of this invention, where like parts have been given like numbers, for use with a condensable propellant of this invention, includes pressure reducing device 22' that is a section of porous medium 50 and vaporizer 24' that is a heated section of porous medium 50, similar as described above with reference to FIG. 5. Vaporizer 24", FIG. 6, may also be utilized. Pressure reducing device 22', FIG. 9, and vaporizer 24' are disposed in housing 72 coupled to anode 30'". Heater 51' heats vaporizer 24' to a temperature greater than or equal to the vaporizer temperature of liquid condensable propellant 42 in housing 72. Vaporizer 24' vaporizes the liquid condensable propellant at the desired vaporization rate and flow rate as discussed above and introduces the vaporized condensable propellant into distributor 40 inside anode 30'". Distributor 40 includes annular plate 42 with azimuthally-spaced orifices 52 that receive the vaporized condensable propellant from chamber 72. Annular plate 44 is coupled to distributor 40 and includes azimuthally-spaced orifices 56 and 58 that distribute the vaporized condensable propellant to distributor 46. Distributor 46 is coupled to annular plate 44 and annular plate 48. Annular plate 48 includes azimuthally-spaced orifices 60, 62, 64, and 66. Distributor 68 is coupled to annular plate 48 and annular plate 69. Annular plate 69 includes plurality of azimuthally-spaced sonic orifices 71, e.g., 8 orifices as shown, although any number of azimuthally-spaced orifices may be used. Distributor 68 azimuthally distributes the vaporized condensable propellant into plasma accelerator 21', as indicated at 73.

Figure 10:
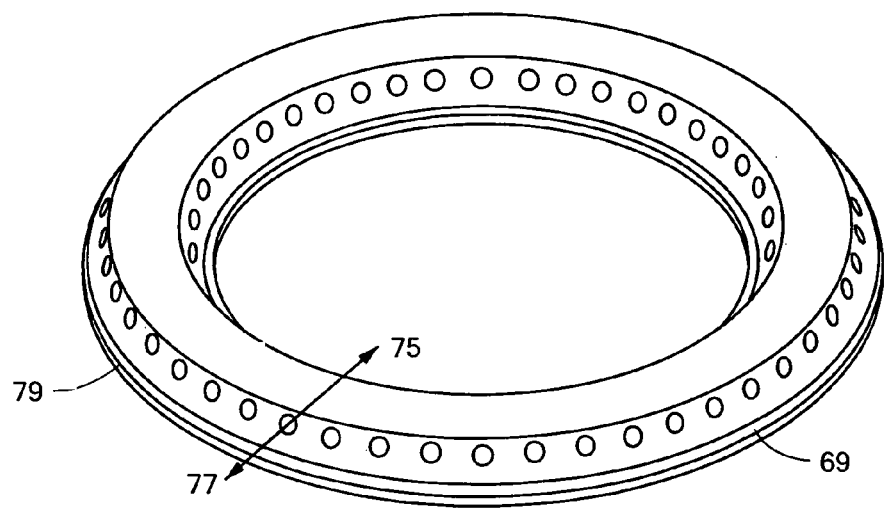
FIG. 10 is a three-dimensional top view showing an annular plate with a plurality of azimuthally-spaced orifices used to introduce the vaporized condensable propellant at uniform flow rate and pressure to the plasma accelerator shown in FIG. 9.

FIG. 10 shows one exemplary design of plate 69 with a plurality of azimuthally-spaced orifices 71'. In this example, there are 24 azimuthally-spaced orifices that each distribute the vaporized condensable propellant to inner side 75 and outer side 77 of plate 69.

The result is that distributors 44, 46, and 68, FIG. 9 with annular plates 42, 44, and 48 having a progressive number of azimuthally-spaced offset orifices provide uniform flow rate and uniform pressure of the vaporized condensable propellant delivered to plasma accelerator 21'.

FIG. 11A, where like parts have been given like numbers, shows the resulting uniform pressure, $P_0$—79 of the vaporized condensable propellant being introduced to plasma accelerator 21', FIG. 9. A uniform flow rate is achieved because all the molecules of the vaporized condensable propellant must travel the same path length, as shown by the arrows connected to arrow 81 in FIG. 11A.

In contrast, a single distributor, such as distributor 85, FIG. 11B, distributes vaporized condensable propellant at non uniform pressures and flow paths, as indicated by $P_0$, $P_1$, $P_2$, and $P_3$, and the arrows connected to arrow 87 inside distributor 85.

The result is Hall thruster 10, FIGS. 1-9, for use with a condensable propellant of this invention controls the flow rate of liquid condensable propellant delivered to vaporizer by reducing the pressure of the liquid condensable propellant with the pressure reducing device. The vaporizer vaporizes the liquid condensable propellant at the predetermined vaporization rate and flow. Using multiple distributors provides uniform flow rate and pressure of the condensable propellant delivered to the plasma accelerator. Thus, Hall thruster 10 of this invention efficiently utilizes and delivers condensable propellants at a desired uniform flow rate and pressure.

Figure 12A:
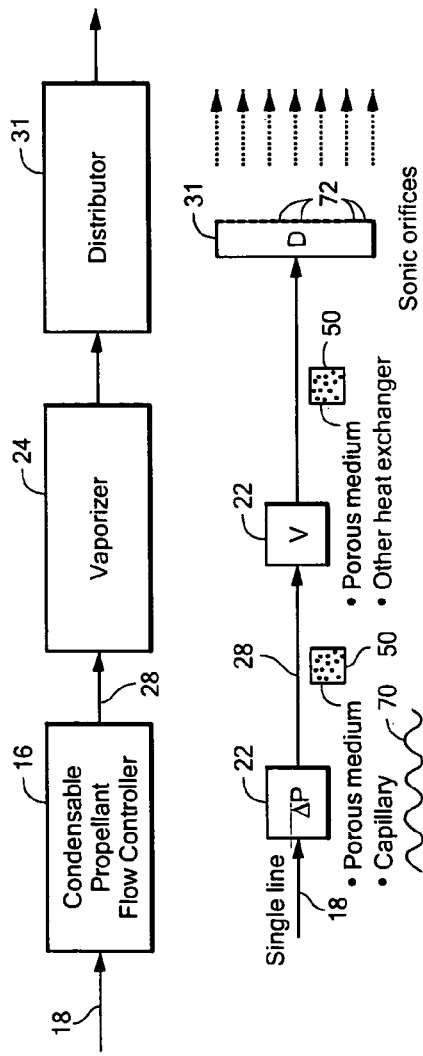
FIG. 12A is a schematic block diagram showing one exemplary arrangement of the condensable propellant flow controller, the distributor and the vaporizer of this invention.

Condensable propellant flow controller 16, FIG. 12A, where like parts have been given like numbers, may be coupled to vaporizer 24 which in turn is coupled to distributor 31. In this example, condensable propellant flow controller 16 includes pressure reducing device 22 that may be porous medium 50 or capillary device 70 (as described above) that reduces the pressure of liquid condensable propellant in feed line 18 to control the flow rate of liquid condensable propellant delivered to vaporizer 24 by feed line 28. As discussed above, vaporizer 24 vaporizes the liquid condensable propellant at the desired vaporization rate and flow rate and provides the vaporized liquid condensable propellant to distributor 31. Distributor 31 may include sonic orifices 72 which distribute the vaporized liquid condensable propellant to plasma accelerator 21, FIGS. 1, 2, 4 or plasma accelerator 21', FIG. 9. The flow rate through sonic orifices 72 is a function of area of each orifice and the pressure at each orifice. Orifices 56, 58, 60-66, and plurality of orifices 71, FIG. 9, are examples of sonic orifices.

Figure 12B:
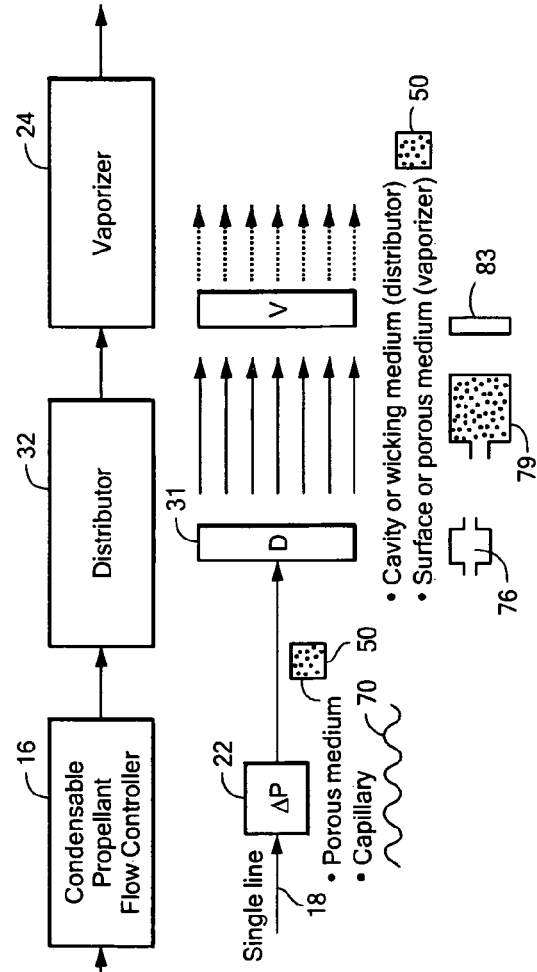
FIG. 12B is a schematic block diagram showing another exemplary arrangement of the condensable propellant flow controller, the distributor and the vaporizer of this invention.

In other designs, condensable propellant flow controller 16, vaporizer 24, and distributor 31 may be coupled to each other in the arrangement as shown in FIG. 12B, where like parts have been given like numbers. In this example, condensable propellant flow controller 16 with pressure reducing device 22, e.g., porous medium 50 or capillary 70 is coupled to distributor 31. Distributor 31 may be cavity 78 or wicking medium 79 e.g., a porous metal, such as titanium, that has a different pore size and porosity than porous medium 50 and functions like a sponge to evenly distribute the liquid condensable propellant to vaporizer 24. Distributor 31 may also include solid surface 83 that evenly distributes the liquid condensable propellant to vaporizer 24.

Vaporizer 24, e.g., a heated section or surface of the porous medium 50, is coupled to distributor 31 and introduces the vaporized condensable propellant to plasma accelerator 21, FIGS. 1, 2, 4 or plasma accelerator 21', FIG. 9.

Figure 12C:
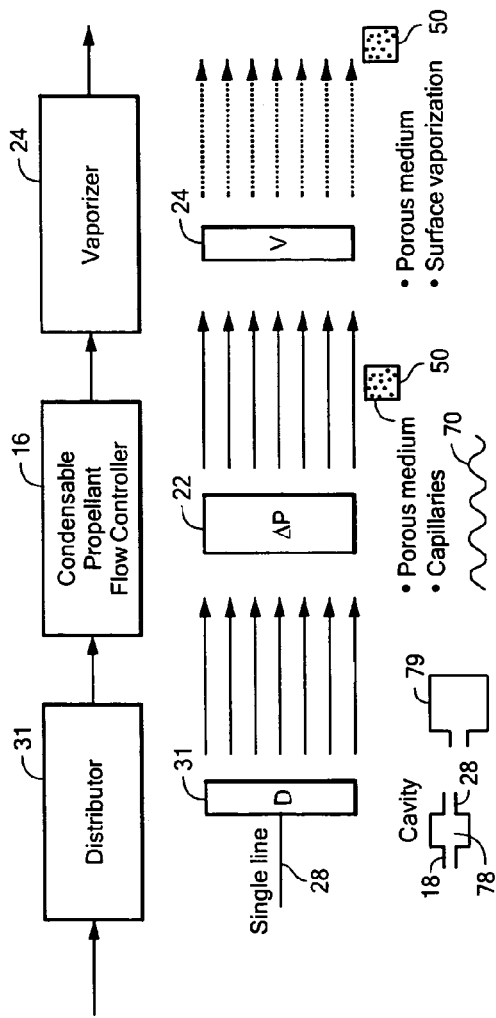
FIG. 12C is a schematic block diagram showing yet another exemplary arrangement of the condensable propellant flow controller, the distributor and the vaporizer of this invention.

In other designs, condensable propellant flow controller 16, vaporizer 24, and distributor 31 may be coupled to each other in the arrangement as shown in FIG. 12C, where like parts have been given like numbers. In this example, distributor 31 includes cavity 78 that receives liquid condensable propellant by feed line 18. Distributor 31 may include wicking medium 79 that distributes the liquid condensable propellant to condensable propellant flow controller 26. Condensable propellant flow controller 16 with pressure reducing device 22, e.g., porous medium 50 or capillary 70 is coupled to distributor 31 and reduces the pressure of liquid condensable propellant received from distributor 31 to control the flow rate of liquid condensable propellant delivered to vaporizer 24. Vaporizer 24 vaporizes the condensable propellant at a predetermined vaporization rate and flow rate and introduces the vaporizer condensable propellant to plasma accelerator 21, FIGS. 1, 2, 4 or plasma accelerator 21', FIG. 9.

Figure 12D:
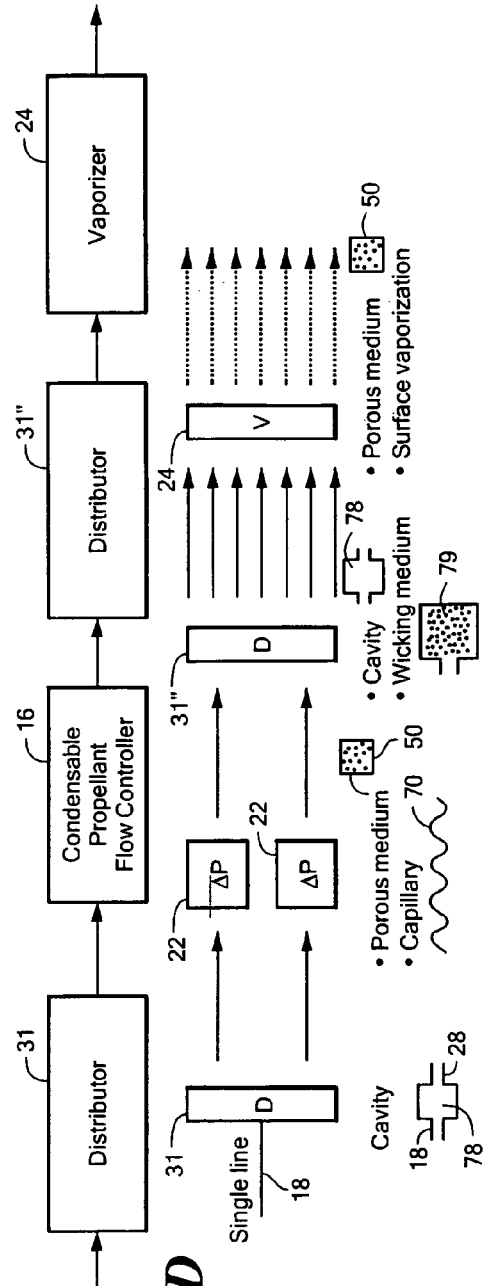
FIG. 12D is a schematic block diagram showing another exemplary arrangement of the condensable propellant flow controller, two distributors, and the vaporizer of this invention.

Condensable propellant flow controller 16, vaporizer 24, and distributor 31 may be coupled to each other in the arrangement as shown in FIG. 12D, where like parts have been given like numbers. In this example, distributor 31 includes cavity 78 that receives liquid condensable propellant by feed line 18 and distributes it to a plurality of pressure reducing devices 22 that regulate the flow rate of the liquid condensable propellant. Condensable propellant flow controller 16 with pressure reducing device 22, e.g., porous medium 50 or capillary 70 as discussed above is coupled to distributor 31 and reduces the pressure of liquid condensable propellant received from distributor 31 to control the flow rate of liquid condensable propellant delivered to second distributor 31". Second distributor 31" may be a cavity 78 or wicking medium 79 as described above in reference to FIG. 12B. Distributor 31" distributes the liquid condensable propellant exiting multiple azimuthally spaced pressure reducing devices 22 to vaporizer 24. Similarly, as described above, vaporizer 24 vaporizes the condensable propellant received from second distributor 31" at the predetermined vaporization rate and flow rate and introduces the vaporizer condensable propellant to plasma accelerator 21, FIGS. 1, 2, 4 or plasma accelerator 21', FIG. 9.

One or more of the pressure reducing device 22, vaporizer 24, distributor 31, and/or second distributor 31" FIGS. 1, 2, 4, 9, and 12A-12D may be located inside or outside of the plasma accelerator 21 or plasma accelerator 21'. Pressure reducing device 22, vaporizer 24, and distributor 31 may all be located inside plasma accelerator 21, 21' or may all be located outside of plasma accelerator 21, 21'. As shown in FIGS. 1 and 2, Hall thruster 10 is arranged with pressure reducing device 22 and vaporizer 24 located outside of plasma accelerator 21 and distributor 31 is located inside plasma accelerator 21. As shown in FIG. 4, Hall thruster 10' is arranged with pressure reducing device 22', vaporizer 24' and distributor 31 all located inside plasma accelerator 21. One advantage of this design is that heat from anode 30' and/or anode 30" generated from the flux of ions exiting plasma accelerator 21 can be used to heat a section or surface of porous medium 50. This reduces the requirement of heater 51, thus saving energy. Hall thruster 10", FIG. 9 is arranged with pressure reducing device 22' and vaporizer 24' in housing 72 coupled to anode 30''' and distributor 31 is located inside plasma accelerator 21'. Similarly, heat from anode 30''' generated from the flux of ions exiting plasma accelerator 21' can be used to heat a section or surface of porous medium 50 in housing 72 and reduce the requirement of heater 51.

Figure 13:
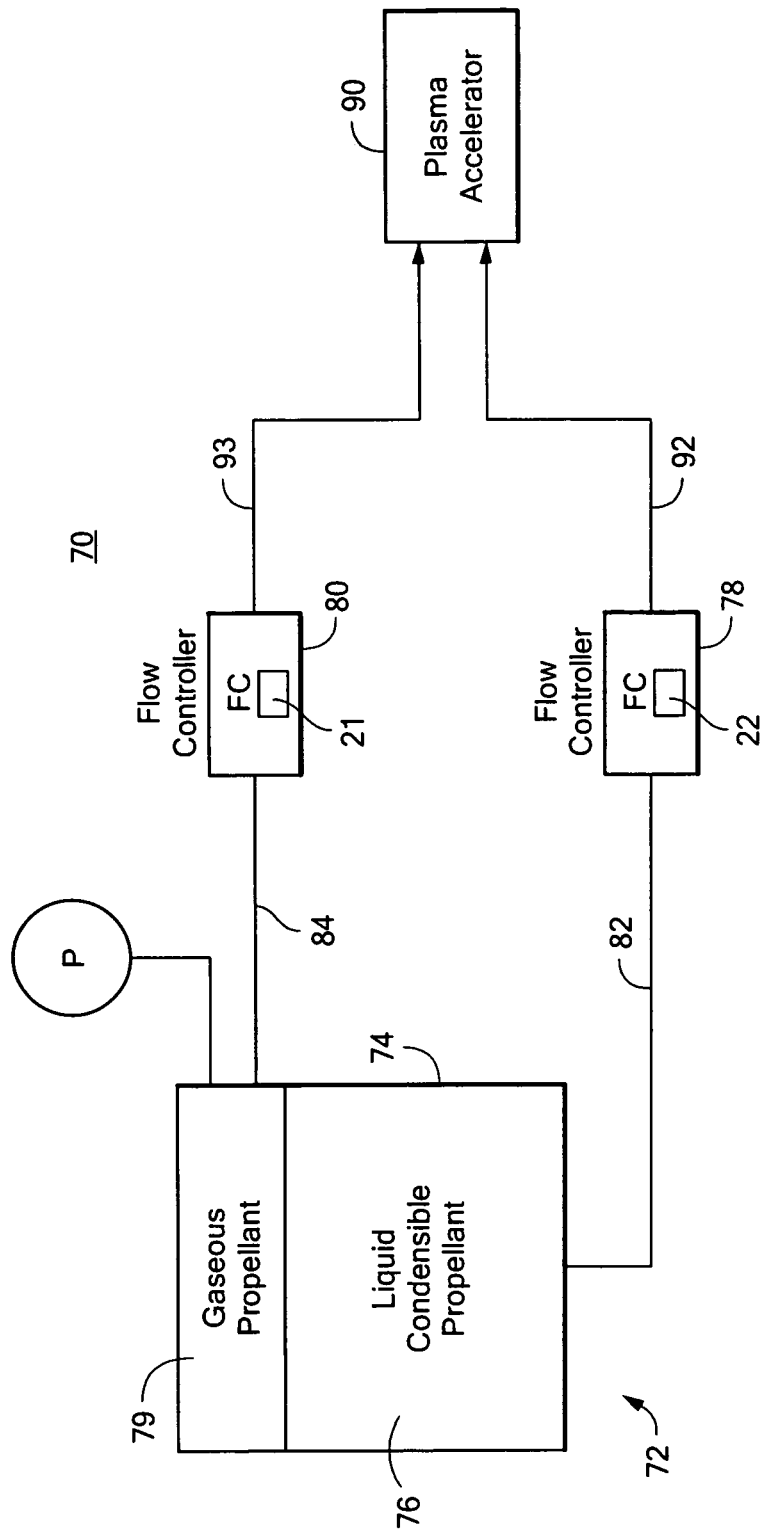
FIG. 13 is a simplified, side sectional, schematic diagram side view of one embodiment of the Hall thruster for use with a condensable propellant, gaseous propellant or mixture of a condensable propellant and gaseous propellant in accordance

Hall thruster 70, FIG. 13, for use with a condensable propellant, a gaseous propellant, or a mixture of a condensable propellant and gaseous propellant of this invention includes condensable propellant and gaseous propellant feed system 72. Condensable propellant and gaseous propellant feed system 72 includes storage vessel 74 that stores liquid condensable propellant 76 and gaseous propellant 78 at a predetermined pressure, e.g., 2400 psi. Condensable propellant flow controller 78 is coupled to storage vessel 74 by feed line 82. Gaseous propellant flow controller 80 is coupled to storage vessel 74 by feed line 84. Ideally, feed line 82 is heated to prevent condensation of the liquid condensable propellant therein.

Condensable propellant flow controller 78 receives liquid condensable propellant 76 by feed line 82 and includes pressure reducing device 22, e.g., a porous medium, a capillary, or an orifice, similar as discussed above with reference to FIGS. 5-8 that controls the flow rate of liquid condensable propellant delivered to plasma accelerator 90 by feed line 92.

Gaseous propellant flow controller 80 receives gaseous propellant 79 by feed line 84 and includes a pressure reducing device 22 that controls the flow rate of gaseous propellant delivered to plasma accelerator 90 by feed line 93.

The liquid condensable propellant in feed line 92 and the gaseous propellant in feed line 93 are delivered to plasma accelerator 90. The condensable propellant is vaporized similar as discussed above with reference to FIGS. 1-12. The vaporized condensable propellant and the gaseous propellant mix by diffusion and are ionized to create a flux of ions using an electric circuit with a cathode that emits electrons, an anode that attracts the ions and generates plasma discharge and a magnetic circuit structure with a magnetic field source that establishes a transverse magnetic field in plasma accelerator 90 that creates an impedance to the flow of the electrons emitted by the cathode toward the anode to create plasma in plasma accelerator and accelerate the ionized condensable propellant, gaseous propellant or mixture of the condensable propellant and gaseous propellant through plasma accelerator 90 to create a flux of ions, similar as described above with reference to FIGS. 1-3, and known by those skilled in the art.

Figure 14:
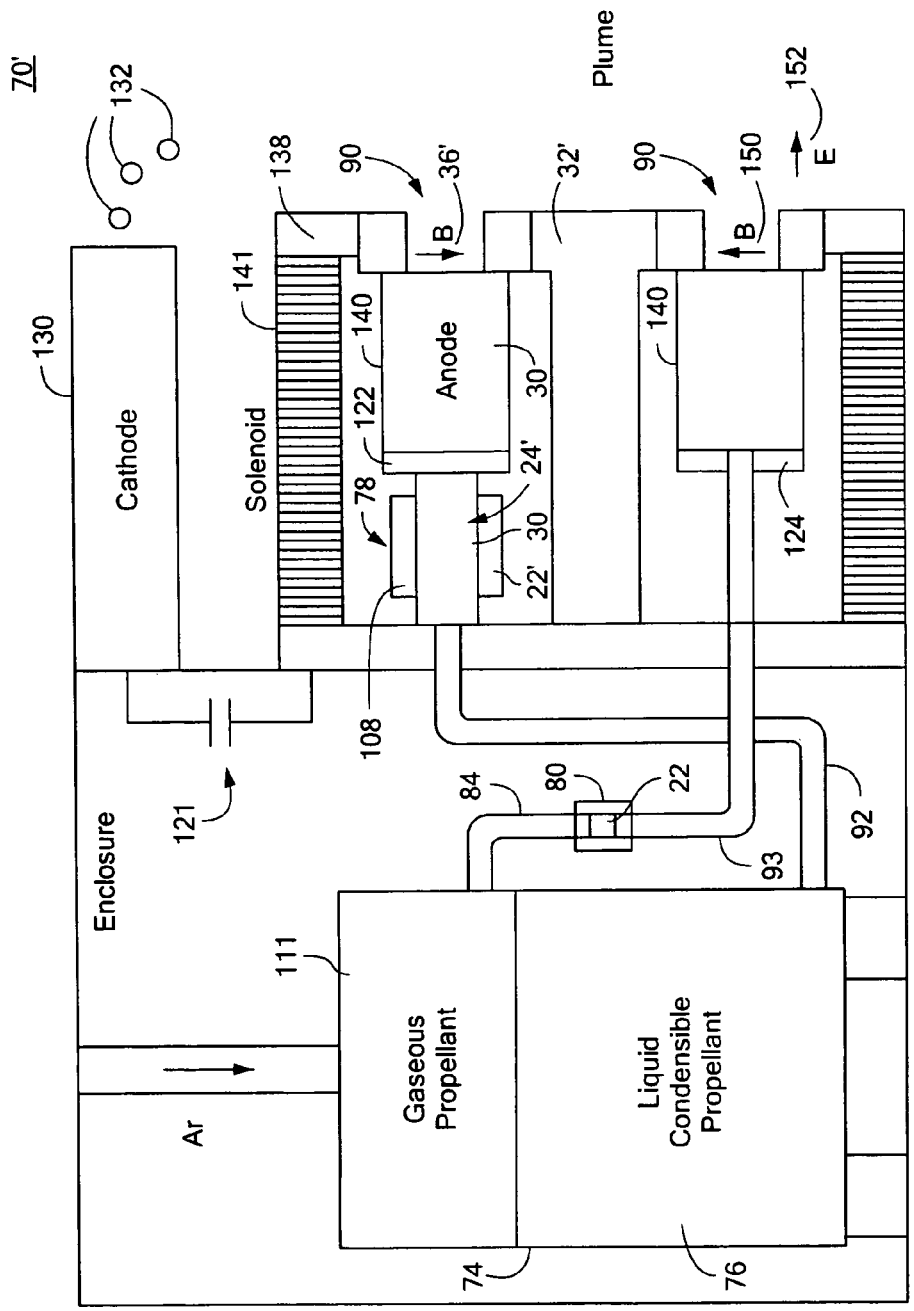
FIG. 14 is a side sectional, schematic diagram showing in further detail one embodiment of the Hall thruster shown in FIG. 12.

FIG. 14, where like parts have been given like numbers, shows one exemplary embodiment of Hall thruster 70' for use with a condensable propellant, gaseous propellant or a mixture of a condensable propellant and gaseous propellant of this invention. In this example, condensable propellant flow controller 78 with pressure reducing device 22' receives liquid condensable propellant 76 in storage vessel 74 by feed line 92. Pressure reducing device 22' includes porous medium 50, as described above with reference to FIGS. 5 and 6, located inside plasma accelerator 90. Porous medium 50 controls the flow rate of condensable propellant in feed line 92 delivered to vaporizer 24'. Vaporizer 24' vaporizes the condensable propellant at a predetermined vaporization rate and flow rate, e.g. 5 mg/s. Heater 108 provides the necessary heat to heat vaporizer 24' to a temperature greater than or equal to the vaporization temperature of the condensable propellant. Distributor 122 receives the vaporized condensable propellant and distributes it to plasma accelerator 90 where it is ionized to create a flux of ions (discussed below).

Pressurized gaseous propellant 111 in storage vessel 74 is delivered to gaseous propellant flow controller 80 via feed line 84. Gaseous propellant flow controller with pressure reducing device 22 controls the flow rate of gaseous propellant delivered to distributor 124 by feed line 93. Distributor 124 introduces the gaseous propellant to plasma accelerator 90.

The vaporized condensable propellant and gaseous propellant, or mixture of gaseous propellant and vaporized condensable propellant introduced to plasma accelerator 90 are the ionized to create a flux of ions using electric circuit 129 that creates axial electric field E—152. Cathode 130 emits electrons 132 that are attached to anode 140. Magnetic circuit structure 138 with a magnetic field source 141, e.g., a solenoid or an electromagnetic coil or similar type device, establishes a transverse magnetic field B—150 in plasma accelerator 90 that creates an impedance to the flow of electrons 132 emitted by cathode 130 toward anode 140 to create plasma in plasma accelerator 90 and accelerates the ionized condensable propellant, gaseous propellant or mixture of the condensable propellant and gaseous propellant through plasma accelerator 90 to create a flux of ions, that may be used as an ion source or to create thrust.

The result is Hall thruster 70 can effectively utilize a condensable propellant, a gaseous propellant, or a mixture thereof as needed during operation.

Figure 15:
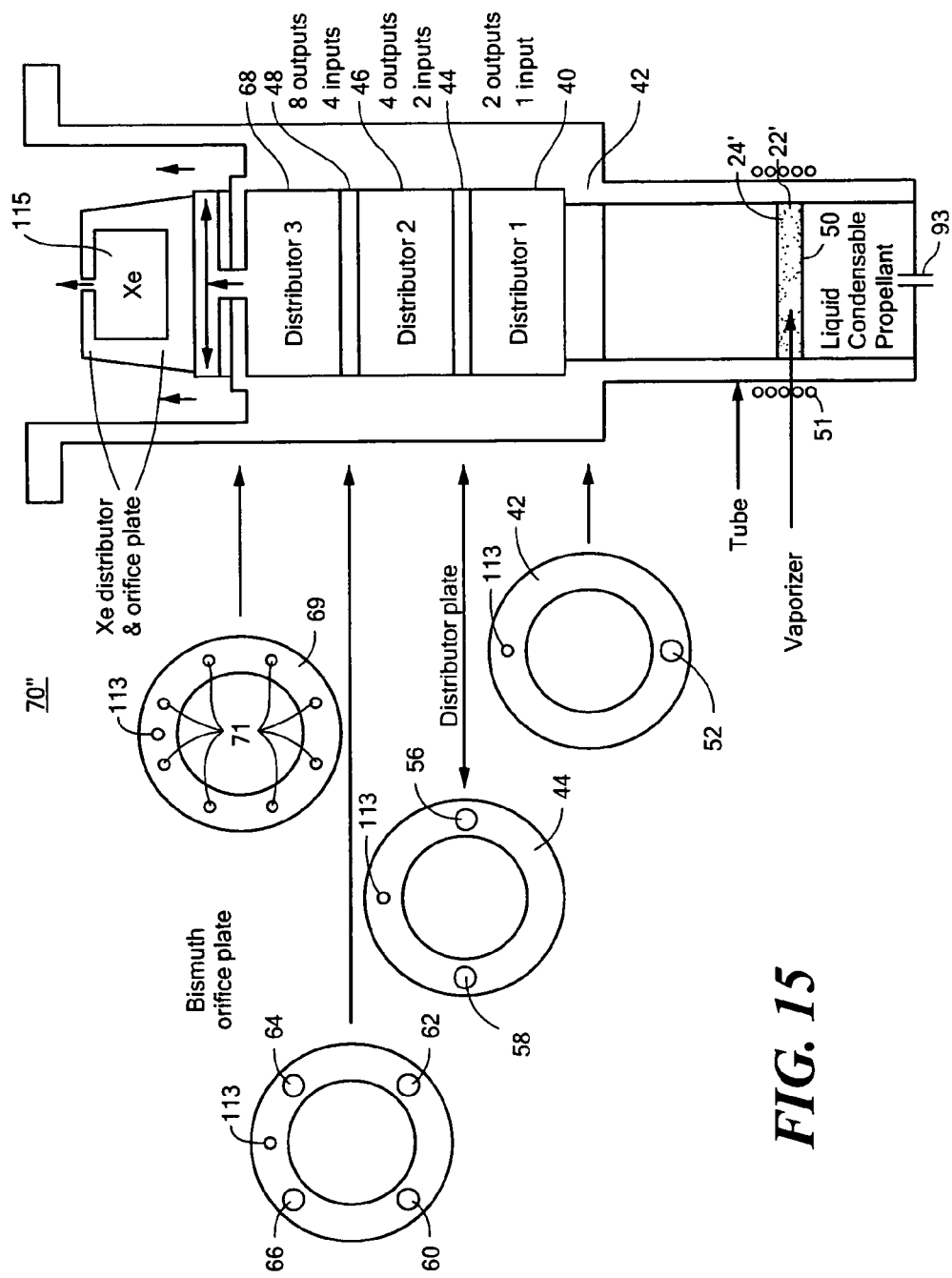
FIG. 15 is a side sectional, schematic diagram of another embodiment of the Hall thruster for use with condensable propellant, gaseous propellant or mixture of a condensable propellant and gaseous propellant in accordance with this invention.
Figure 16:
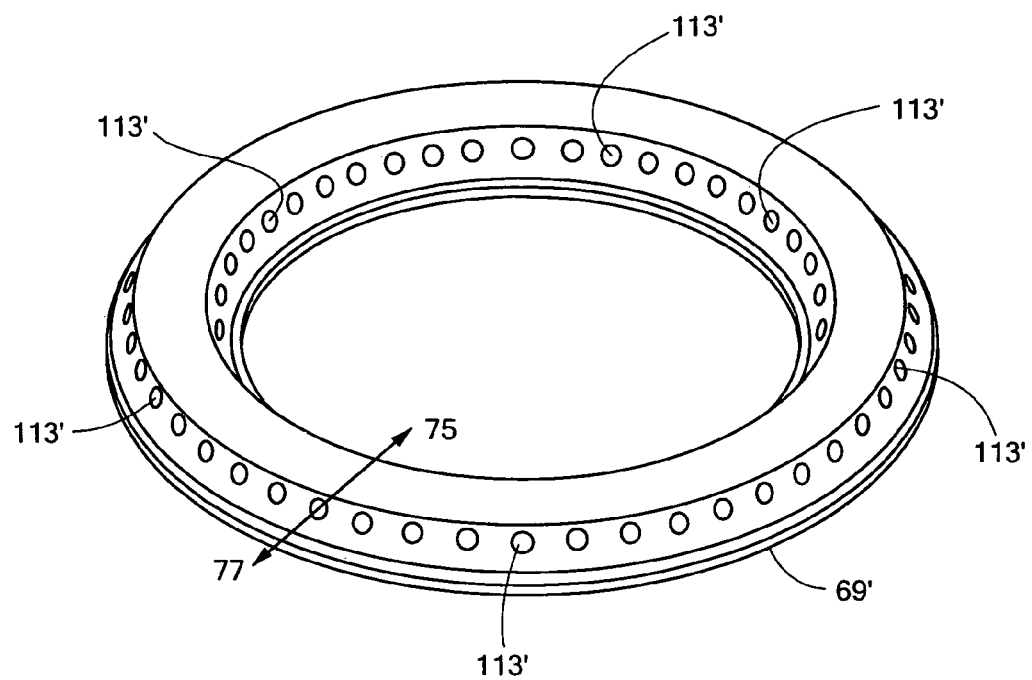
FIG. 16 is a schematic side view showing the uniform pressure and flow path of the vaporized condensable propellant provided by the plurality-of distributors shown in FIG. 14.

Hall thruster 70", FIG. 15, where like parts have been given like numbers, has the same similar design as Hall thruster 10", FIG. 9, except in this design, annular plates 42, 44, 48, and 69 include tube 113 that distributes gaseous propellant 111 in feed line 93 to gas distributor 115. Gas distributor 115 introduces gaseous propellant into plasma accelerator 21'. The vaporized condensable propellant introduced by distributor 68 and the gaseous propellant introduced by gas distributor 115 mix by diffusion. FIG. 16 shows one design of plate 69' that includes a plurality of gaseous propellant tubes 113'.

Figure 17:
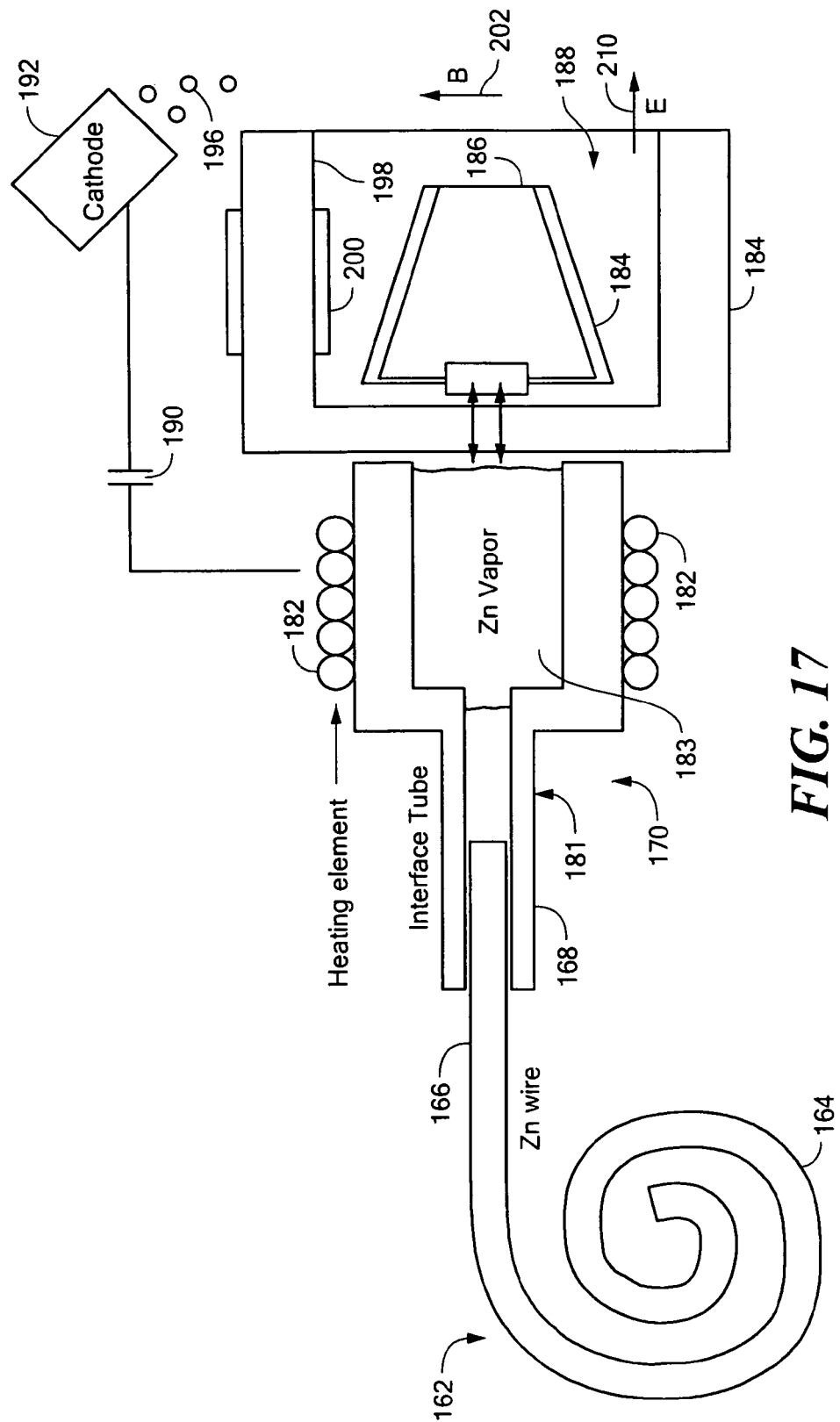
FIG. 17 is a side sectional, schematic diagram of one embodiment of the Hall thruster for use with a solid condensable propellant of this invention.

Hall thruster 160, FIG. 17, for use with a solid condensable propellant of this invention includes condensable propellant feed system 162 that includes coil 164 of solid condensable propellant, e.g., bismuth, cadmium, cesium, magnesium, iodine, lithium, tin, lead, indium, germanium, zinc, sulfur, phosphorus, selenium, sodium, potassium, and rubidium or any of the condensable propellants or compounds thereof discussed above that may be fed into the thruster in a solid state. If the condensable propellant is non-ductile, it may be fed as granules, grams, pellets, or a rod. Condensable propellant feed system 162, e.g., an electric motor or spool gun, provides a portion of coil 164 of solid condensable propellant, e.g., wire section 166, at a linearly controlled rate to interface tube 168 of vaporizer 170. Heater 182 about vaporizer 170 melts wire section 166 of solid condensable propellant in section 181 in interface tube 168. The liquid condensable propellant is then vaporized in section 183 of vaporizer 170. The vaporized condensable propellant is then delivered to distributor 184 which distributes the vaporizer condensable propellant to plasma accelerator 188.

The result is Hall thruster 160 for use with a solid condensable propellant of this invention controls the flow rate of the condensable propellant delivered to vaporizer 170 by linearly controlling the rate solid condensable propellant 164 is delivered to vaporizer 170. Vaporizer 170 then vaporizes the liquid condensable propellant at a predetermined vaporization rate and flow rate.

The condensable propellant in plasma accelerator 188 is ionized to create a flux of ions using electric circuit 190 that creates axial electric field E—210 and cathode 192 that emits electrons 196 that are attached to anode 186. Similar as discussed above with reference to FIGS. 1-3, magnetic circuit structure 198 with a magnetic field source 200 establishes transverse magnetic field B—202 in plasma accelerator 188 that creates an impedance to the flow of electrons 196 emitted by cathode 192 toward anode 186 to create plasma in plasma accelerator 188 and accelerates the ionized condensable propellant through plasma accelerator 188 to create a flux of ions that may be used as an ion source, or to create thrust.

Figure 18:
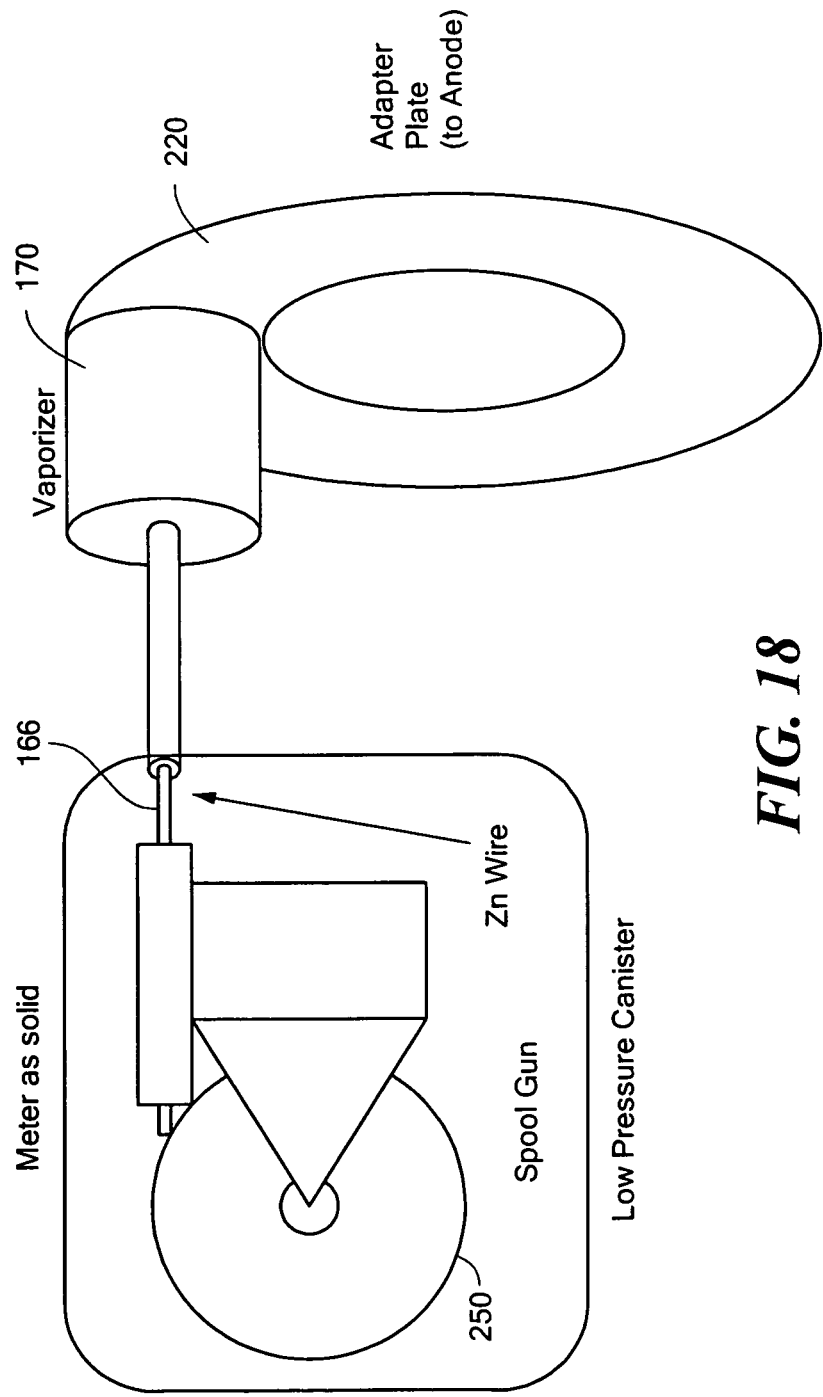
FIG. 18 is a three-dimensional side view showing one example of the components of the Hall thruster for use with a solid condensable propellant shown in FIG. 14.

FIG. 18 shows one example of spool gun 250 that stores coil 164, FIG. 17, of solid condensable propellant. Spool gun 250, FIG. 18, delivers the solid condensable propellant as wire section 166, FIG. 17, at a linearly controlled rate to vaporizer 170. Adapter plate 210, FIG. 18, is configured to be coupled to plasma accelerator 188, FIG. 14.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A Hall thruster for use with a condensable propellant comprising:
   a plasma accelerator including an anode for providing plasma discharge;
   a distributor for distributing the condensable propellant in a liquid or vaporized state;
   an electric circuit including a cathode for emitting electrons attracted to the anode and for neutralizing ion flux emitted from the plasma accelerator;
   a condensable propellant feed system including a storage vessel for storing the condensable propellant and providing liquid condensable propellant at a controlled pressure;
   a condensable propellant flow controller including a pressure reducing device for controlling the flow rate of the liquid condensable propellant;

a vaporizer at or above the vaporization temperature of the liquid condensable propellant for vaporizing the liquid condensable propellant at a predetermined vaporization rate and flow rate; and a magnetic circuit structure including a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

2. The Hall thruster of claim 1 in which the condensable propellant feed system includes a feed line coupled between the storage vessel and the condensable propellant flow controller.

3. The Hall thruster of claim 2 in which the feed line is heated.

4. The Hall thruster of claim 1 in which the condensable propellant feed system includes a pump for delivering liquid condensable propellant to the propellant flow controller.

5. The Hall thruster of claim 1 further including a heater disposed about the storage vessel for melting solid condensable propellant to form the liquid condensable propellant.

6. The Hall thruster of claim 5 in which the storage vessel includes a pressurized gas for introducing the liquid condensable propellant to the condensable propellant feed system at the controlled pressure.

7. The Hall thruster of claim 6 in which the condensable propellant feed system includes a pressure regulating device for controlling the pressure of the liquid condensable propellant exiting in the condensable propellant feed system.

8. The Hall thruster of claim 1 in which the condensable propellant flow controller includes a pressure measurement device.

9. The Hall thruster of claim 1 in which the condensable propellant is a condensable propellant chosen from the group consisting of: bismuth, cadmium, cesium, magnesium, iodine, lithium, tin, mercury, lead, indium, germanium, zinc, sulfur, phosphorus, selenium, sodium, potassium, and rubidium.

10. The Hall thruster of claim 6 in which the pressurized gas is a gas chosen from the group consisting of xenon, helium, neon, argon, krypton, oxygen, radon, and nitrogen.

11. The Hall thruster of claim 1 in which the pressure reducing device includes a porous medium.

12. The Hall thruster of claim 1 in which the pressure reducing device includes a capillary.

13. The Hall thruster of claim 1 in which the pressure reducing device includes an orifice sized to control the flow rate of the liquid condensable propellant.

14. The Hall thruster of claim 1 in which the pressure reducing device includes a plenum.

15. The Hall thruster of claim 1 in which the vaporizer includes a heated surface.

16. The Hall thruster of claim 1 in which the vaporizer includes a heated portion of a porous medium.

17. The Hall thruster of claim 1 in which the vaporizer includes a heated portion of a capillary.

18. The Hall thruster of claim 1 in which the vaporizer includes a heat exchanger.

19. The Hall thruster of claim 1 in which the pressure regulating device and the vaporizer are integrated on a porous medium such that the porous medium controls the flow rate of the liquid condensable propellant and a heated surface of the porous medium vaporizes the liquid condensable propellant.

20. The Hall thruster of claim 1 in which the pressure regulating device and the vaporizer are integrated on a porous medium such that the porous medium controls the flow rate of the liquid condensable propellant and a heated portion of the porous medium vaporizes the liquid condensable propellant.

21. The system of claim 1 in which the pressure reducing device includes a porous medium that controls the flow rate of the liquid condensable propellant and another porous medium that vaporizes the liquid condensable propellant.

22. The Hall thruster of claim 1 in which the condensable propellant flow controller, the vaporizer, and the distributor are located outside the plasma accelerator.

23. The Hall thruster of claim 1 in which the condensable propellant flow controller, the vaporizer, and the distributor are located inside the plasma accelerator.

24. The Hall thruster of claim 1 in which one or more of the condensable propellant flow controller, the vaporizer, and the distributor are located inside the plasma accelerator and one or more of the condensable flow controller, the vaporizer, and the distributor are located outside the plasma accelerator.

25. The Hall thruster of claim 1 in which the distributor includes a cavity.

26. The Hall thruster of claim 1 in which the distributor includes a wicking medium or a solid surface.

27. The Hall thruster of claim 1 in which the distributor includes sonic orifices.

28. The Hall thruster of claim 1 further including a heater disposed about the distributor.

29. The Hall thruster of claim 1 in which at least one of the condensable propellant flow controller, the vaporizer, and the distributor are coupled to each other in a predetermined arrangement.

30. The Hall thruster of claim 29 in which the distributor receives vaporized condensable propellant from the vaporizer and distributes the vaporized condensable propellant to the plasma accelerator.

31. The Hall thruster of claim 29 in which the distributor receives liquid condensable propellant from the condensable propellant flow controller and distributes the liquid condensable propellant to the vaporizer.

32. The Hall thruster of claim 29 in which the distributor receives liquid condensable propellant from the condensable propellant feed system and distributes the liquid condensable propellant to the condensable propellant flow controller.

33. The Hall thruster of claim 32 further including a second distributor for receiving liquid condensable propellant from the condensable propellant flow controller having a plurality of pressure reducing devices and the second distributor distributes the liquid condensable propellant to the vaporizer.

34. The Hall thruster of claim 1 further including a plurality of distributors each having an annular plate on one side having a predetermined number of azimuthally-spaced orifices and another annular plate on the other side having a predetermined number of azimuthally-spaced orifices for providing a uniform flow path and pressure of the vaporized condensable propellant introduced to the plasma accelerator.

35. The Hall thruster of claim 1 in which heat from the anode is used to increase vaporization of the condensable propellant.

36. The Hall thruster of claim 1 further including a composite anode including a housing with inner and outer walls forming an outer anode and an inner anode forming inner and outer distributor zones for containing the plasma.

37. An ion source for use with a condensable propellant comprising:
a plasma accelerator including an anode for providing plasma discharge;
a distributor for distributing the condensable propellant in a liquid or vaporized state;

an electric circuit including a cathode for emitting electrons attracted to the anode and for neutralizing ion flux emitted from the plasma accelerator;

a condensable propellant feed system including a storage vessel for storing the condensable propellant and providing liquid condensable propellant at a controlled pressure;

a condensable propellant flow controller including a pressure reducing device for controlling the flow rate of the liquid condensable propellant;

a vaporizer at or above the vaporization temperature of the liquid condensable propellant for vaporizing the liquid condensable propellant at a predetermined vaporization rate and flow rate; and a magnetic circuit structure including a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

38. A Hall thruster for use with a condensable propellant, a gaseous propellant, or a mixture of condensable propellant and gaseous propellant comprising:

a plasma accelerator including an anode for providing plasma discharge;

a distributor for distributing vaporized condensable propellant, gaseous propellant, or the mixture of vaporized condensable propellant and gaseous propellant;

an electric circuit including a cathode for emitting electrons attracted to the anode and for neutralizing ion flux emitted from the plasma accelerator;

a condensable propellant and gaseous propellant feed system including a storage vessel for storing the liquid condensable propellant and the gaseous propellant at a predetermined pressure;

a condensable propellant flow controller for controlling the flow rate of the liquid condensable propellant;

a gaseous propellant flow controller for controlling the flow rate of the gaseous propellant; and a magnetic circuit structure including a magnetic field source for establishing a transverse magnetic field in the plasma accelerator that creates an impedance to the flow of the electrons toward the anode to create plasma in the plasma accelerator for accelerating ionized condensable propellant, gaseous propellant, or a mixture of the condensable propellant and gaseous propellant through the plasma accelerator to create a flux of ions.

39. The thruster of claim 38 in which the condensable propellant flow controller includes a pressure reducing device.

40. The Hall thruster of claim 38 in which the condensable propellant feed system and the gaseous propellant feed system each include a feed line.

41. The Hall thruster of claim 40 in which the feed line coupled to the condensable propellant feed system is heated.

42. The Hall thruster of claim 38 further including a heater disposed about the storage vessel for melting solid condensable propellant to form the liquid condensable propellant.

43. The Hall thruster of claim 38 in which the condensable propellant feed system includes a pressure regulating device for controlling the pressure of the liquid condensable propellant exiting in the compensable propellant feed system.

44. The Hall thruster of claim 38 in which the condensable propellant flow controller includes a pressure measurement device.

45. The Hall thruster of claim 38 in which the condensable propellant is a condensable propellant chosen from the group consisting of bismuth, cadmium, cesium, magnesium, iodine, lithium, tin, mercury, lead, indium, germanium, zinc, sulfur, phosphorus, selenium, sodium, potassium, and rubidium.

46. The Hall thruster of claim 38 in which the gaseous propellant is a gas chosen from the group consisting of xenon, helium, neon, argon, krypton, oxygen, radon, and nitrogen.

47. The Hall thruster of claim 39 in which the pressure reducing device includes a porous medium.

48. The Hall thruster of claim 39 in which the pressure reducing device includes a capillary.

49. The Hall thruster of claim 39 in which the pressure reducing device includes an orifice sized to control the flow rate of the liquid condensable propellant.

50. The Hall thruster of claim 39 in which the pressure reducing device includes a plenum.

51. The Hall thruster of claim 39 further including a vaporizer for vaporizing the liquid condensable propellant at a predetermined vaporization rate and flow rate.

52. The Hall thruster of claim 51 in which the vaporizer includes a heated surface.

53. The Hall thruster of claim 52 in which the vaporizers include a heated portion of a porous medium.

54. The Hall thruster of claim 52 in which the vaporizers include a heated portion of a capillary.

55. The Hall thruster of claim 52 in which the vaporizers include a heat exchanger.

56. The Hall thruster of claim 39 in which the pressure regulating device and a vaporizer are integrated on a porous medium such that the porous medium controls the flow rate of the liquid condensable propellant and a heated surface of the porous medium vaporizes the liquid condensable propellant.

57. The Hall thruster of claim 39 in which the pressure regulating device and a vaporizer are integrated on a porous medium such that the porous medium controls the flow rate of the liquid condensable propellant and a heated portion of the porous medium vaporizes the liquid condensable propellant.

58. The system of claim 39 in which the pressure reducing device includes a porous medium that controls the flow rate of the liquid condensable propellant and another porous medium that vaporizes the condensable propellant.

59. The Hall thruster of claim 51 in which the condensable propellant flow controller, and the gaseous propellant flow controller, the vaporizer, and the distributor are located outside the plasma accelerator.

60. The Hall thruster of claim 51 in which the condensable propellant flow controller, and the gaseous propellant flow controller, the vaporizer, and the distributor are located inside the plasma accelerator.

61. The Hall thruster of claim 38 in which one or more of the condensable propellant flow controller, a vaporizer, and the distributor are located inside the plasma accelerator and one or more of the condensable flow controller, the vaporizer, and the distributor are located outside the plasma accelerator.

62. The Hall thruster of claim 38 in which the distributor includes a cavity.

63. The Hall thruster of claim 38 in which the distributor includes a wicking medium or a solid surface.

64. The Hall thruster of claim 38 in which the distributor includes sonic orifices.

65. The Hall thruster of claim 38 further including a heater disposed about the distributor.

66. The Hall thruster of claim 51 in which at least one of the condensable propellant flow controller, the vaporizer, and the distributor are coupled to each other in a predetermined arrangement.

67. The Hall thruster of claim 51 in which the distributor receives vaporized condensable propellant from the vaporizer and gaseous propellant from the gaseous propellant flow controller and distributes the vaporized condensable propellant and gaseous propellant to the plasma accelerator.

68. The Hall thruster of claim 51 in which the distributor receives vaporized condensable propellant from the vaporizer and distributes the vaporized condensable propellant to the plasma accelerator and a gas distributor receives gaseous propellant from the gaseous propellant flow controller and distributes the gaseous propellant to the plasma accelerator.

69. The Hall thruster of claim 51 in which the distributor receives liquid condensable propellant from the condensable propellant flow controller and distributes the liquid condensable propellant to the vaporizer.

70. The Hall thruster of claim 51 in which the distributor receives liquid condensable propellant from the condensable propellant feed system and distributes the liquid condensable propellant to the condensable propellant flow controller.

71. The Hall thruster of claim 70 further including a second distributor for receiving liquid condensable propellant from the condensable propellant flow controller and the second distributor distributes the liquid condensable propellant to the vaporizer.

72. The Hall thruster of claim 38 further including a plurality of distributors each having an annular plate on one side having a predetermined number of azimuthally-spaced orifices and another annular plate on the other side having a predetermined number of azimuthally-spaced orifices for providing a uniform flow path and pressure of the vaporized condensable propellant introduced to the plasma accelerator.

73. The Hall thruster of claim 38 in which heat from the anode is used to increase vaporization of the condensable propellant.

74. The Hall thruster of claim 38 further including a composite anode including a housing with inner and outer walls forming an outer anode and an inner anode forming inner and outer distributor zones for containing the plasma.

75. An ion source for use with a condensable propellant, a gaseous propellant or a mixture of condensable propellant and gaseous propellant comprising:
   a plasma accelerator including an anode for providing plasma discharge;
   a distributor for distributing vaporized condensable propellant, gaseous propellant, or a mixture of the vaporized condensable propellant and gaseous propellant into the plasma accelerator;
   an electric circuit including a cathode for emitting electrons attracted to the anode and for neutralizing ion flux emitted from the plasma accelerator;
   a condensable propellant and gaseous propellant feed system including a storage vessel for storing liquid condensable propellant in a liquid state and the gaseous propellant at a predetermined pressure;
   a condensable propellant flow controller system for controlling the flow rate of the liquid condensable propellant to the gas distributor;
   a gaseous propellant flow controller for controlling the flow rate of the gaseous propellant; and
   a magnetic circuit structure including a magnetic field source for establishing a transverse magnetic field in the plasma accelerator that creates an impedance to the flow of the electrons toward the anode to create plasma in the plasma accelerator for accelerating ionized condensable propellant, gaseous propellant, or a mixture of condensable propellant and gaseous propellant through the plasma accelerator to create a flux of ions.

76. A Hall thruster for use with a condensable propellant, a gaseous propellant or a mixture of condensable and gaseous propellant comprising:
   a plasma accelerator including an anode for providing plasma discharge;
   a distributor for distributing vaporized condensable propellant, gaseous propellant, or a mixture of the vaporized condensable propellant and gaseous propellant into the plasma accelerator;
   an electric circuit including a cathode for emitting electrons attracted to the anode and for neutralizing ion flux emitted from the plasma accelerator;
   a condensable propellant and gaseous propellant feed system including a storage vessel for storing liquid condensable propellant in a liquid state and the gaseous propellant at a predetermined pressure;
   a condensable flow controller including a pressure reducing device for controlling the flow rate of the liquid condensable propellant to the gas distributor;
   a gaseous propellant flow controller for controlling the flow rate of the gaseous propellant;
   a vaporizer at or above the vaporization temperature of the liquid condensable propellant for vaporizing the liquid condensable propellant at a predetermined vaporization rate and flow rate; and
   a magnetic circuit structure including a magnetic field source for establishing a transverse magnetic field in the plasma accelerator that creates an impedance to the flow of the electrons toward the anode to create plasma in the plasma accelerator for accelerating ionized condensable propellant, gaseous propellant and a mixture of condensable propellant and gaseous propellant through the plasma accelerator to create a flux of ions.

77. An ion source for use with a condensable propellant, a gaseous propellant or a mixture of condensable and gaseous propellant comprising:
   a plasma accelerator including an anode for providing plasma discharge;
   a distributor for distributing vaporized condensable propellant, gaseous propellant, or a mixture of the vaporized condensable propellant and gaseous propellant into the plasma accelerator;
   an electric circuit including a cathode for emitting electrons attracted to the anode and for neutralizing ion flux emitted from the plasma accelerator;
   a condensable propellant and gaseous propellant feed system including a storage vessel for storing liquid condensable propellant in a liquid state and the gaseous propellant at a predetermined pressure;
   a condensable flow controller including a pressure reducing device for controlling the flow rate of the liquid condensable propellant to the gas distributor;
   a gaseous propellant flow controller for controlling the flow rate of the gaseous propellant;
   a vaporizer at or above the vaporization temperature of the liquid condensable propellant for vaporizing the liquid condensable propellant at a predetermined vaporization rate and flow rate; and
   a magnetic circuit structure including a magnetic field source for establishing a transverse magnetic field in the plasma accelerator that creates an impedance to the flow of the electrons toward the anode to create plasma in the plasma accelerator for accelerating ionized condensable propellant, gaseous propellant and a mixture of condensable propellant and gaseous propellant through the plasma accelerator to create a flux of ions.

78. A Hall thruster for use with a solid condensable propellant comprising:
- a plasma accelerator including an anode for providing plasma discharge;
- a distributor for distributing vaporized condensable propellant to the plasma accelerator;
- an electric circuit including a cathode for emitting electrons attracted to the anode and for neutralizing ion flux emitted from the plasma accelerator;
- a condensable propellant feed system including predetermined form of solid condensable propellant for providing solid condensable propellant at a controlled rate;
- a vaporizer at or above the vaporization temperature of the solid condensable propellant for vaporizing the solid condensable propellant to provide vaporized condensable propellant at a predetermined vaporization rate and flow rate and introducing the vaporized condensable propellant to the distributor; and
- a magnetic circuit structure including a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

79. A Hall thruster of claim 78 in which the predetermined form of the compensable propellant is a form chosen from the group consisting or: a coil, granules, grains, pellets, and rods.

80. The Hall thruster of claim 78 in which the solid condensable propellant is a condensable propellant chosen from the group consisting of: bismuth, cadmium, cesium, magnesium, iodine, lithium, tin, lead, indium, germanium, zinc, sulfur, phosphorus, selenium, sodium, potassium, and rubidium.

81. A Hall thruster for use with a condensable propellant comprising:
- a plasma accelerator including an anode for providing plasma discharge;
- a distributor for distributing the condensable propellant in a liquid or vaporized state;
- an electric circuit including a cathode for emitting electrons attracted to the anode and for neutralizing ion flux emitted from the plasma accelerator;
- a condensable propellant feed system including a storage vessel for storing the condensable propellant and providing liquid condensable propellant at a controlled pressure;
- a condensable propellant flow controller including a pressure reducing device for controlling the flow rate of the liquid condensable propellant;
- a vaporizer at or above the vaporization temperature of the liquid condensable propellant for vaporizing the liquid condensable propellant at a predetermined vaporization rate and flow rate and introducing the vaporized condensable propellant into the plasma accelerator; and
- a magnetic circuit structure including a magnetic field source for establishing a transverse magnetic field in the plasma accelerator that creates an impedance to the flow of the electrons toward the anode to create plasma in the plasma accelerator for accelerating ionized condensable propellant through the plasma accelerator to create a flux of ions.

82. A Hall thruster for use with a condensable propellant comprising:
- a condensable propellant feed system including a storage vessel for storing the condensable propellant and providing liquid condensable propellant at a controlled pressure;
- a condensable propellant flow controller including a pressure reducing device for controlling the flow rate of the liquid condensable propellant; and
- a vaporizer at or above the vaporization temperature of the liquid condensable propellant for vaporizing the liquid condensable propellant at a predetermined vaporization rate and flow rate and introducing the vaporized condensable propellant to the Hall thruster to create a flux of ions.

\* \* \* \* \*